(12) United States Patent
Kubouchi

(10) Patent No.: US 12,160,176 B2
(45) Date of Patent: Dec. 3, 2024

(54) POWER CONVERTER

(71) Applicant: FUJI ELECTRIC CO., LTD., Kawasaki (JP)

(72) Inventor: Motoyoshi Kubouchi, Matsumoto (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 51 days.

(21) Appl. No.: 17/876,319

(22) Filed: Jul. 28, 2022

(65) Prior Publication Data

US 2023/0078856 A1 Mar. 16, 2023

(51) Int. Cl.
| | |
|---|---|
| *H02M 7/537* | (2006.01) |
| *H02M 1/42* | (2007.01) |
| *H02M 3/335* | (2006.01) |
| *H02M 7/483* | (2007.01) |
| *H02M 7/487* | (2007.01) |
| *H02M 7/49* | (2007.01) |

(52) U.S. Cl.
CPC ..... *H02M 3/33569* (2013.01); *H02M 1/4283* (2021.05); *H02M 3/33523* (2013.01); *H02M 7/537* (2013.01); *H02M 7/4837* (2021.05); *H02M 7/487* (2013.01); *H02M 7/49* (2013.01)

(58) Field of Classification Search
CPC ...... H02M 7/4837; H02M 7/487; H02M 7/49; H02M 7/537
See application file for complete search history.

(56) References Cited

U.S. PATENT DOCUMENTS

| 9,982,621 | B2* | 5/2018 | Debelak | F02D 41/24 |
| 10,348,209 | B2* | 7/2019 | Lee | H02M 3/3376 |
| 11,736,027 | B2* | 8/2023 | Ngoua Teu Magambo | H02M 7/219 363/17 |
| 2011/0242854 | A1* | 10/2011 | Minami | H02M 1/4258 363/17 |
| 2012/0155124 | A1* | 6/2012 | Cheng | H02M 3/33573 363/24 |
| 2019/0386572 | A1* | 12/2019 | Itoh | H02M 1/40 |

FOREIGN PATENT DOCUMENTS

| JP | H11-215824 A | 8/1999 |
| JP | 2021-040395 A | 3/2021 |

* cited by examiner

*Primary Examiner* — Gary A Nash
(74) *Attorney, Agent, or Firm* — Rabin & Berdo, P.C.

(57) ABSTRACT

A power converter, includes: a first line to which a first voltage is applied; a second line to which a second voltage lower than the first voltage is applied; a third line to which a third voltage lower than the second voltage is applied; a first bridge circuit that is provided between the first line and the second line, the first bridge circuit including a plurality of first switching elements; a second bridge circuit that is provided between the second line and the third line, the second bridge circuit including a plurality of second switching elements; and a voltage output circuit configured to generate a predetermined direct current (DC) voltage based on operations of the first and second bridge circuits.

17 Claims, 17 Drawing Sheets

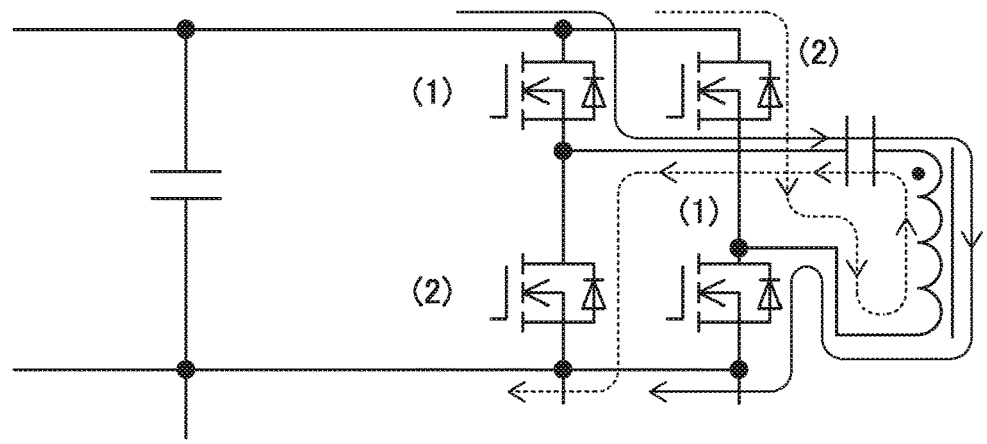
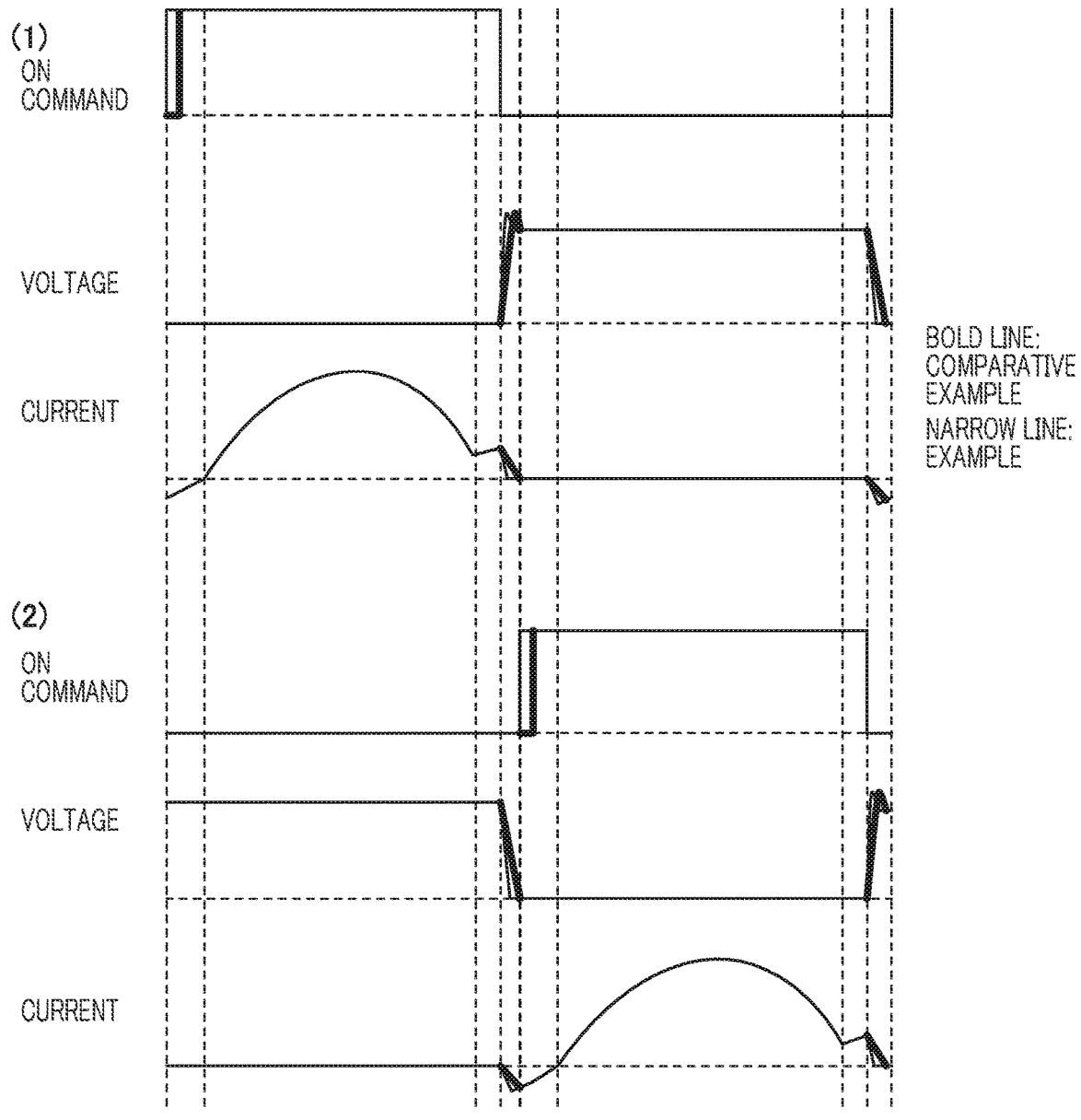
FIG. 3

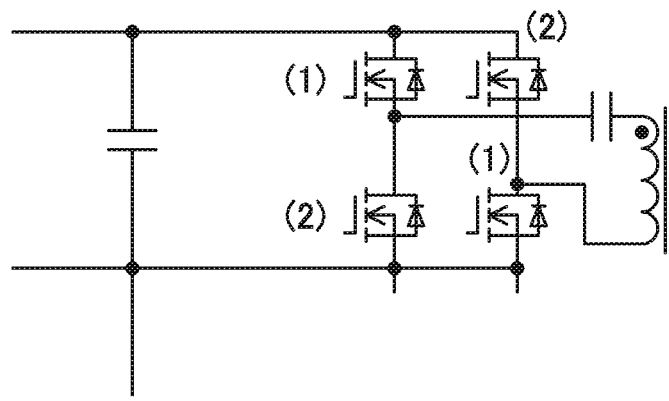
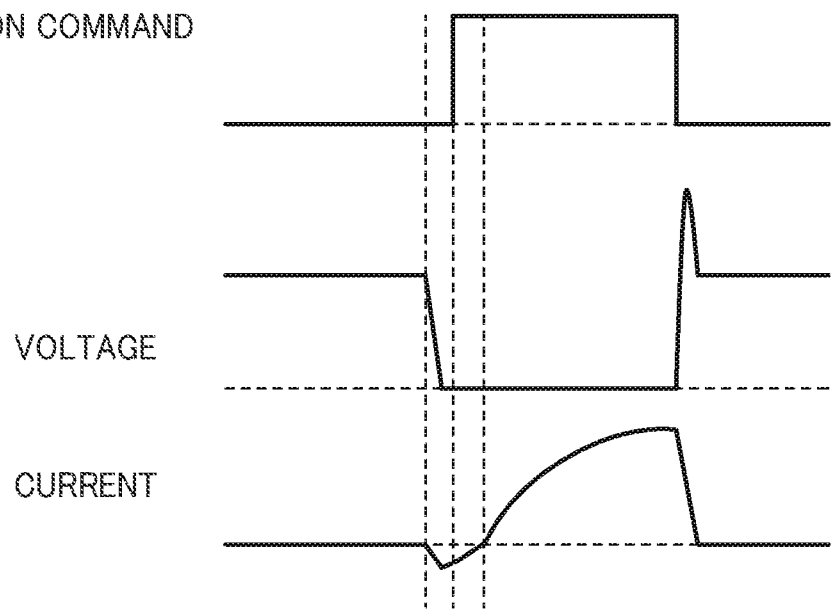
FIG. 4

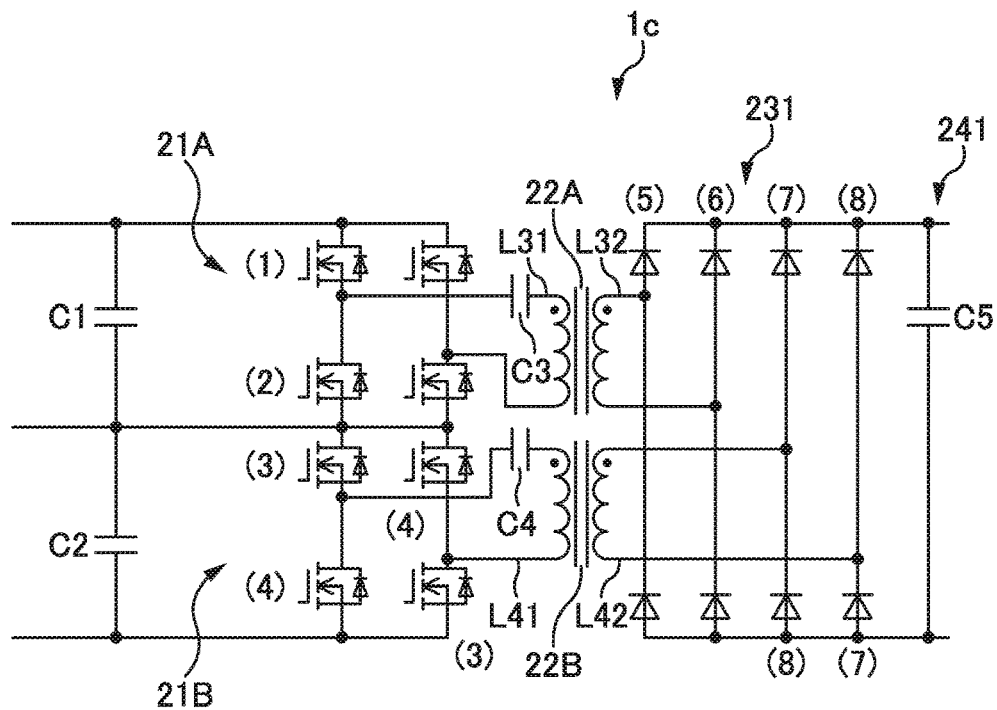
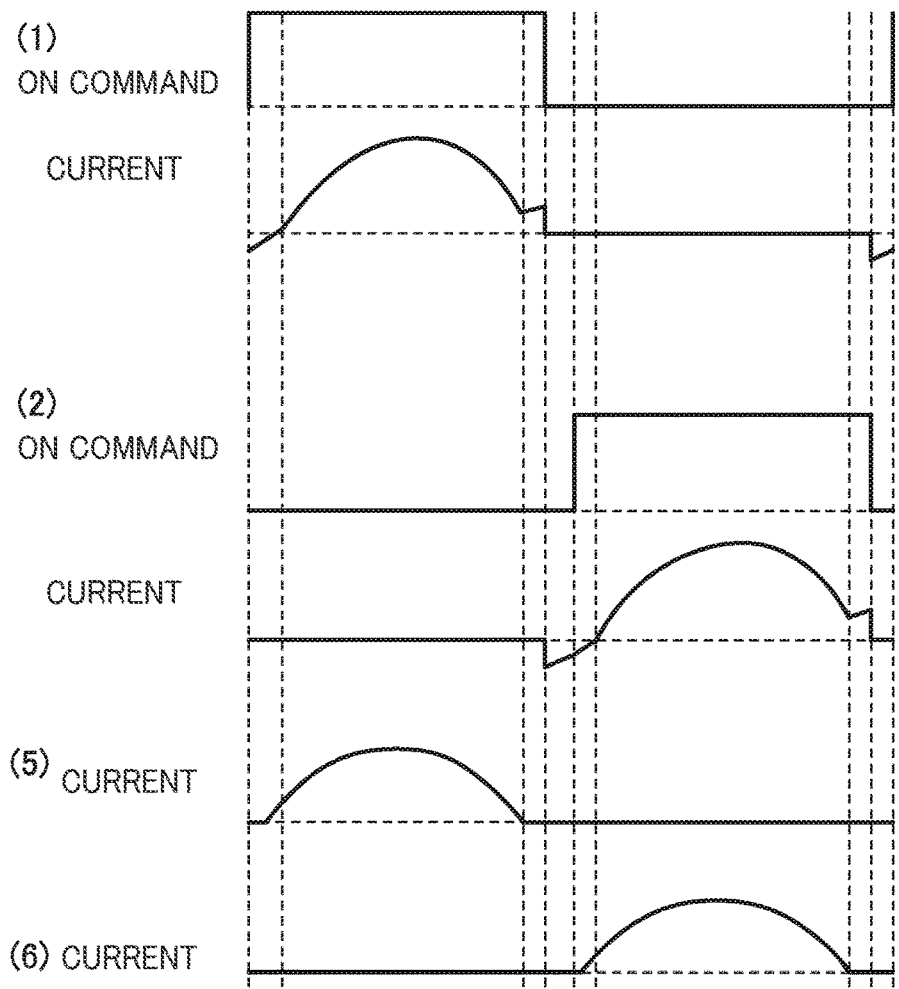
FIG. 7

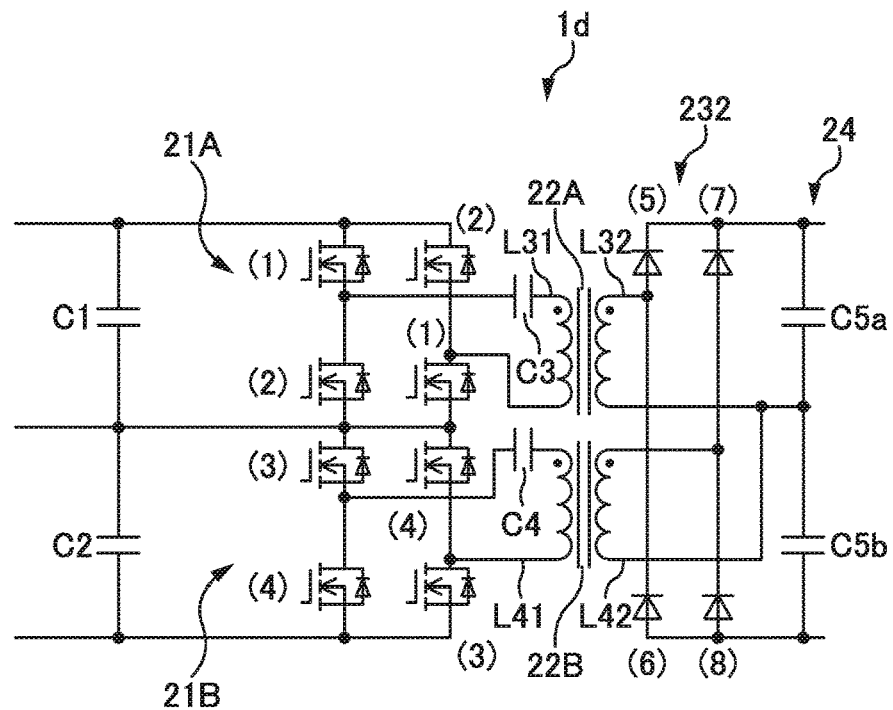
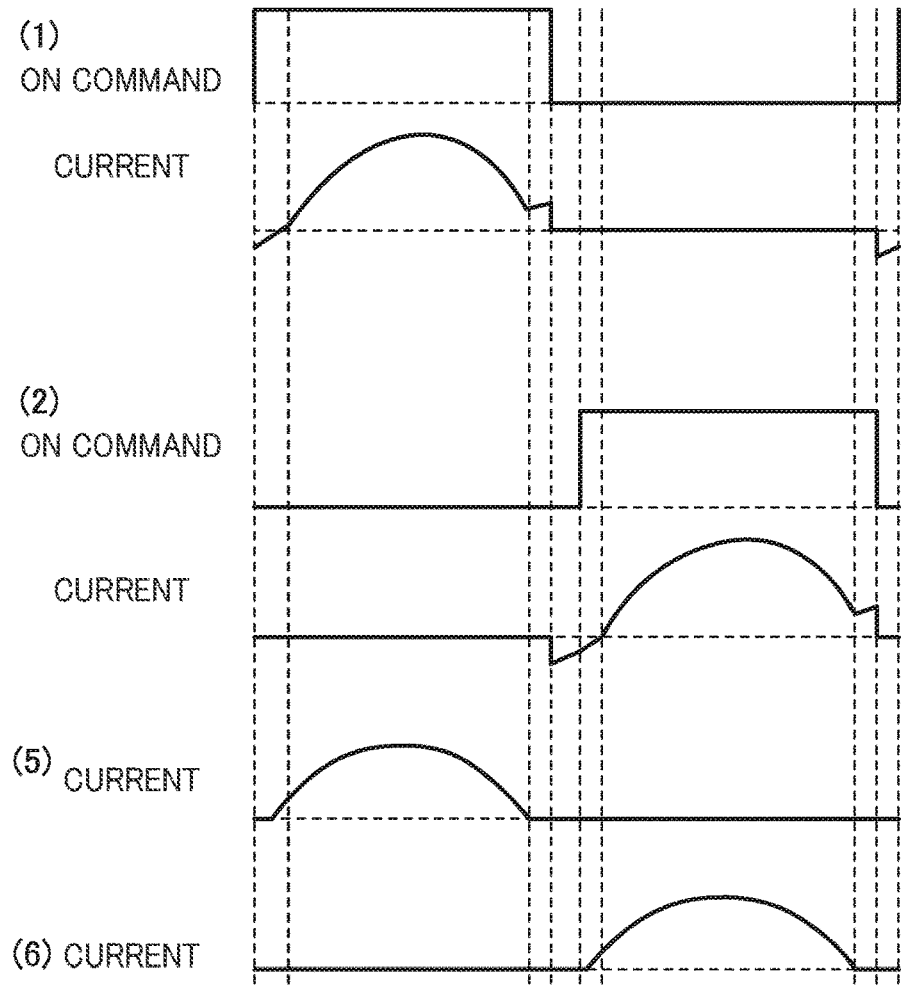
FIG. 9

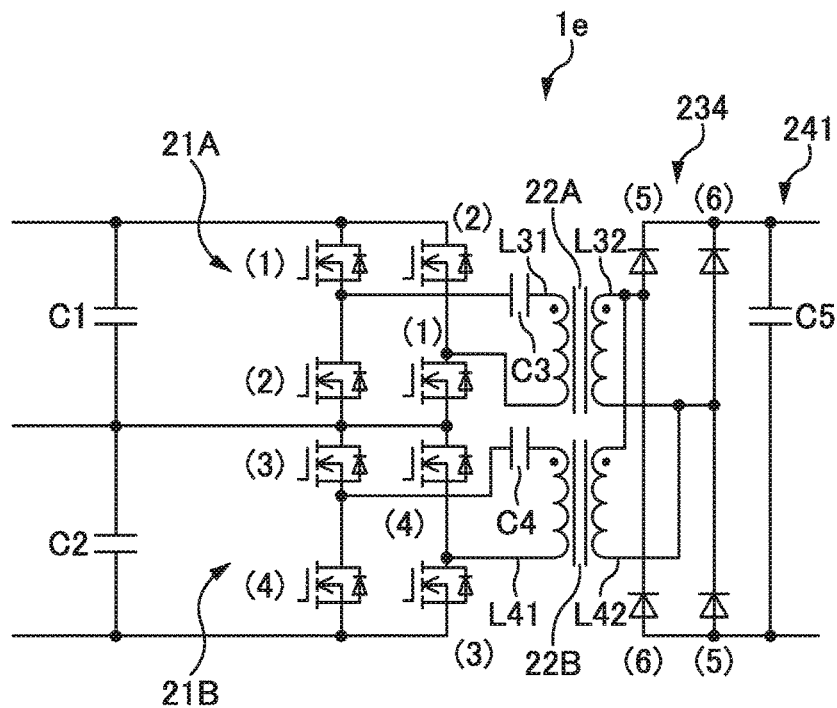
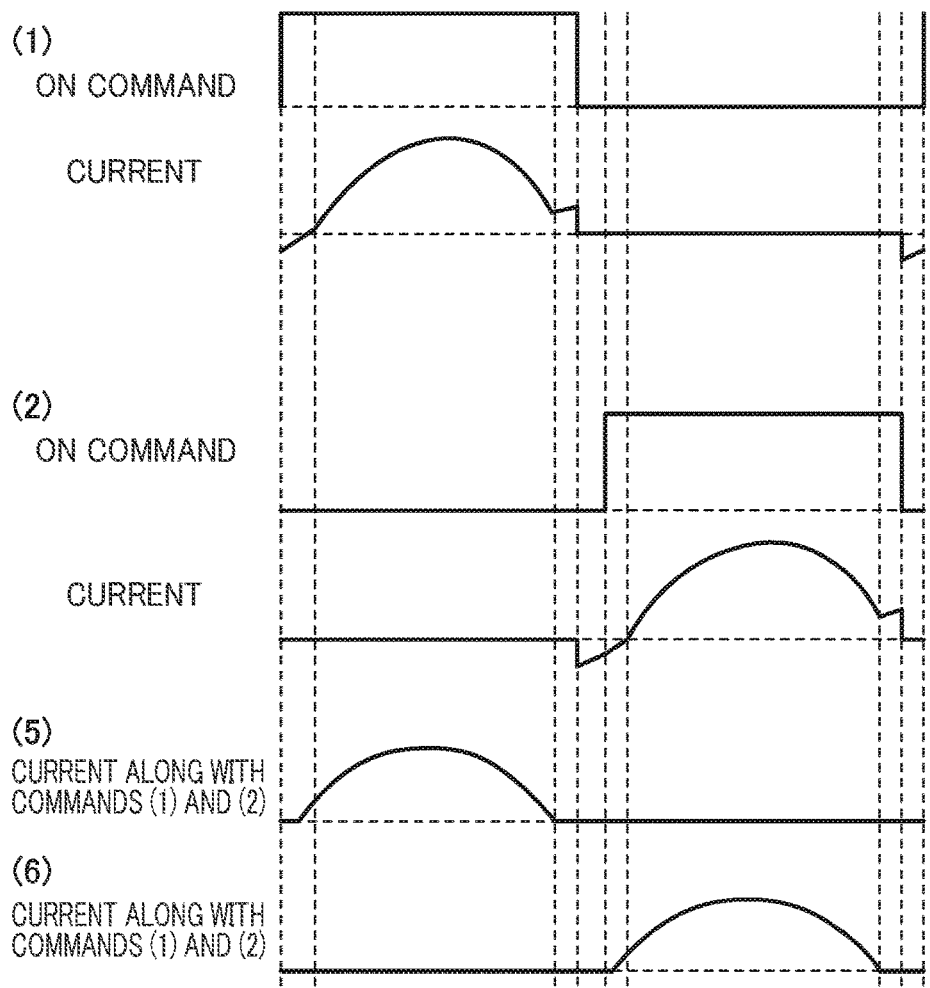
FIG. 12

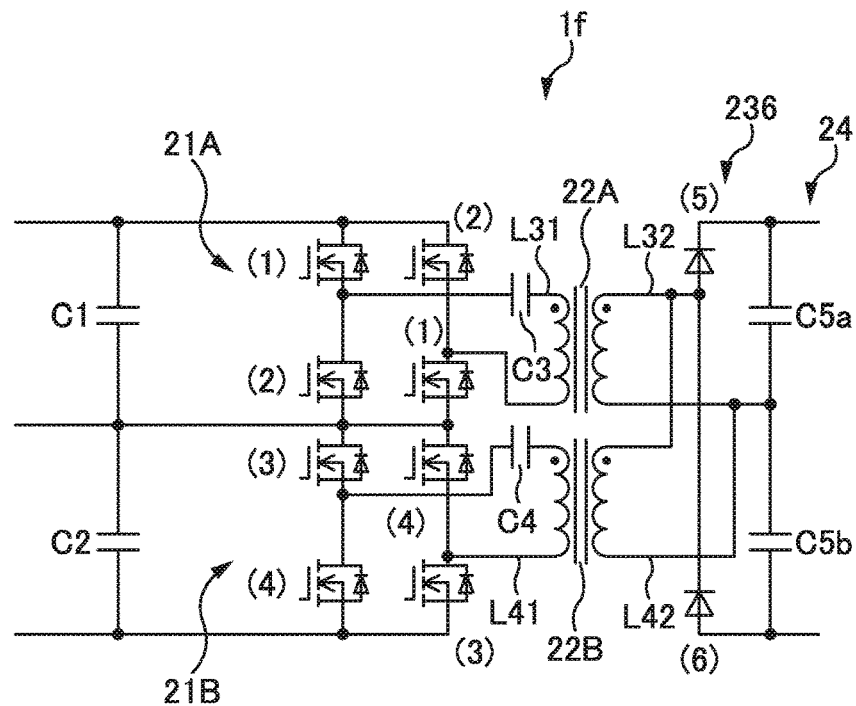
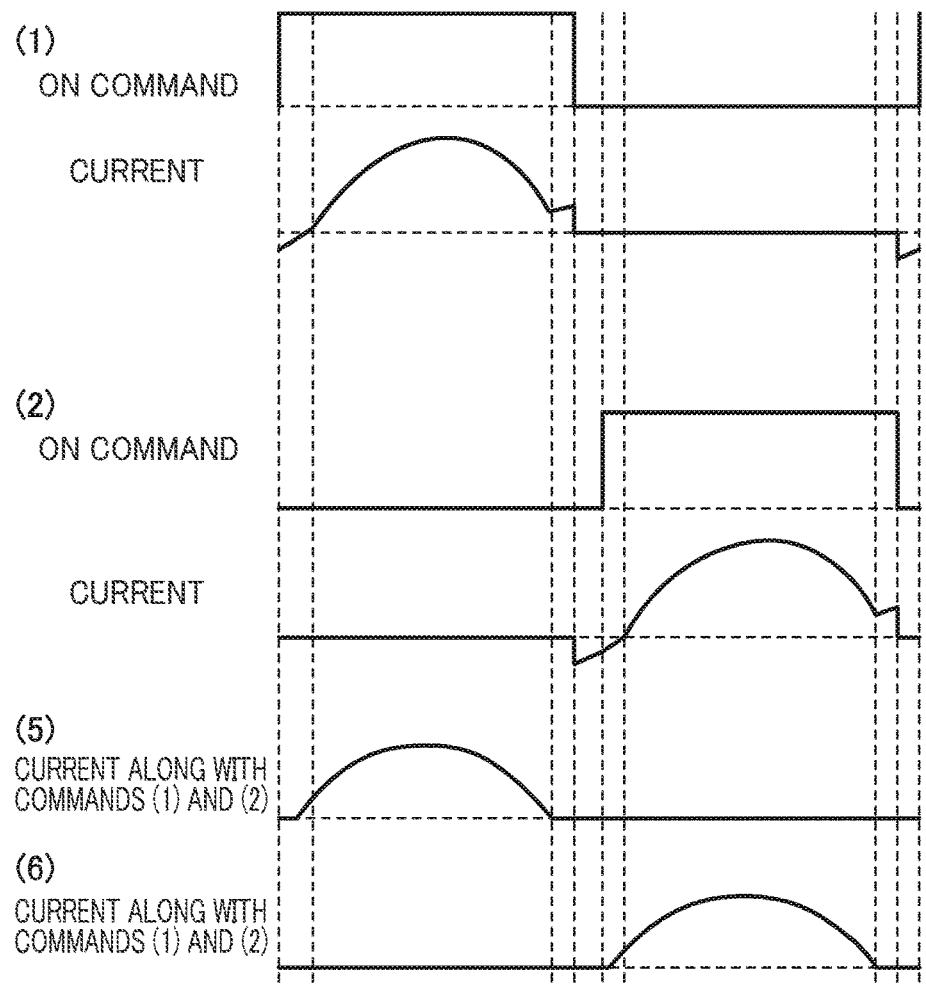
FIG. 14

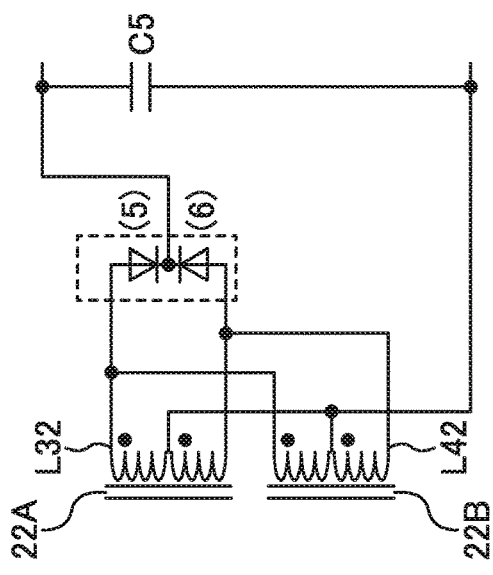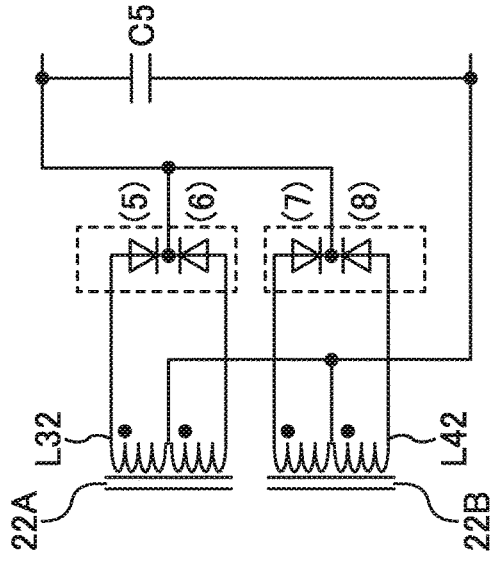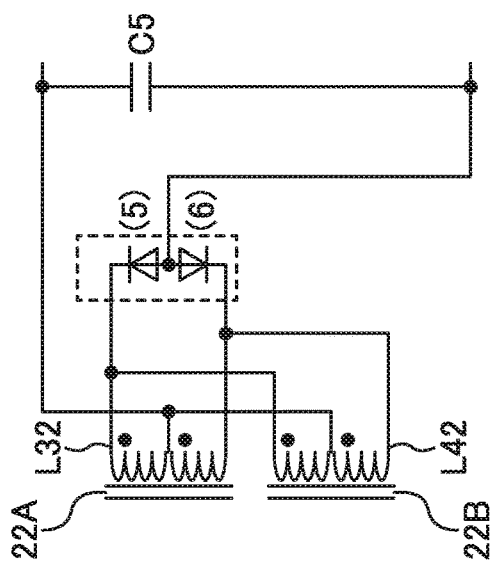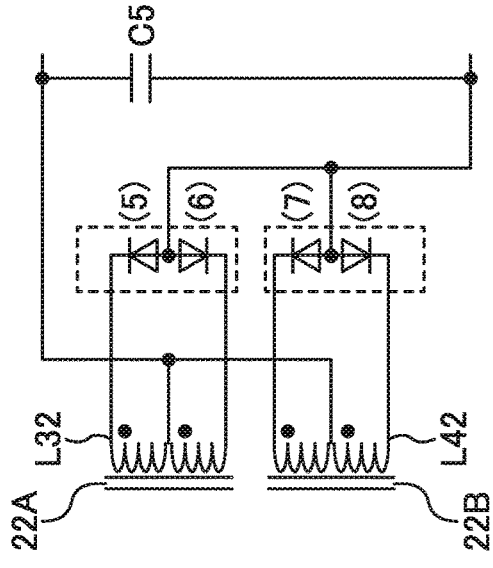

POWER CONVERTER

CROSS-REFERENCE TO RELATED APPLICATION

The present application claims priority pursuant to 35 U.S.C. § 119(a) from Japanese Patent Application Number 2021-150772, filed on Sep. 16, 2021, the entire disclosure of which is hereby incorporated by reference herein.

BACKGROUND

Technical Field

The present disclosure relates to a power converter.

Description of the Related Art

There has been known a power converter that performs power conversion of a varying input voltage into a constant voltage by using a boost circuit, a high-frequency transformer (an isolation transformer), and the like (for example, see Japanese Patent Application Publication Nos. H11-215824 and 2021-40395). In Japanese Patent Application Publication No. 2021-40395, the power conversion of an input voltage into a constant voltage is performed by boosting the input voltage by a boost chopper (a boost circuit) and thereafter using an inverter including multiple switching elements (a bridge circuit), an isolation transformer, a rectifier circuit, and the like.

When an output voltage of a boost circuit is high, a bridge circuit in a following stage needs a switching element with a higher withstand-voltage than the output voltage (with a high withstand-voltage). However, since the switching element with a high withstand-voltage is expensive and a response of turning off a small current is slow, it is difficult to perform a high-frequency operation (high-speed switching). Additionally, even with a use of the switching element with a high withstand-voltage, there is a risk that the element may be broken due to a turn-off surge.

SUMMARY

An aspect of the present disclosure to achieve the above objective is a power converter, comprising: a first line to which a first voltage is applied; a second line to which a second voltage lower than the first voltage is applied; a third line to which a third voltage lower than the second voltage is applied; a first bridge circuit that is provided between the first line and the second line, the first bridge circuit including a plurality of first switching elements; a second bridge circuit that is provided between the second line and the third line, the second bridge circuit including a plurality of second switching elements; and a voltage output circuit configured to generate a predetermined direct current (DC) voltage based on operations of the first and second bridge circuits.

BRIEF DESCRIPTION OF THE DRAWINGS

FIG. 3 is a diagram describing effectiveness of the present embodiment.

FIG. 4 is a diagram illustrating a case where a turn-off surge occurs.

FIG. 7 is a circuit diagram and a waveform diagram illustrating a part of a configuration of a power converter 1c in a second embodiment.

FIG. 9 is a circuit diagram and a waveform diagram illustrating a part of a configuration of a power converter 1d in a third embodiment.

FIG. 12 is a circuit diagram and a waveform diagram illustrating a part of a configuration of a power converter 1e in a fourth embodiment.

FIG. 14 is a circuit diagram and a waveform diagram illustrating a part of a configuration of a power converter if in a fifth embodiment.

FIGS. 16A to 16F are explanatory diagrams of a sixth embodiment.

DETAILED DESCRIPTION

At least the following details will become apparent from descriptions of the present specification and of the accompanying drawings.

<<<About Power Converter>>>

A power converter of the present embodiment is, for example, an auxiliary power supply device having a relatively large capacity that supplies a load such as a lighting and an air conditioner of a rail vehicle with power. In such a power converter, a side on which power is inputted (an input side) and a side on which power is outputted (an output side) need to be isolated from each other, and thus an isolation transformer is used to secure the isolation. As the isolation transformer, a high-frequency isolation transformer is applied for the purpose of downsizing and weight saving. As the conversion using the high-frequency isolation transformer, an input needs to be converted into a high-frequency alternating current. For this reason, a DC voltage is converted into a high-frequency alternating current by a bridge circuit including a switching element and is then inputted to the high-frequency isolation transformer. Also, a DC-DC converter circuit (a DC-DC converter) that rectifies and smooths the AC output by a rectifier circuit and a smoothing circuit and then converts the AC output into a direct current again is used commonly.

Before the power converter of the present embodiment is described, first, a comparative example is described.

Comparative Example

Figure 1:
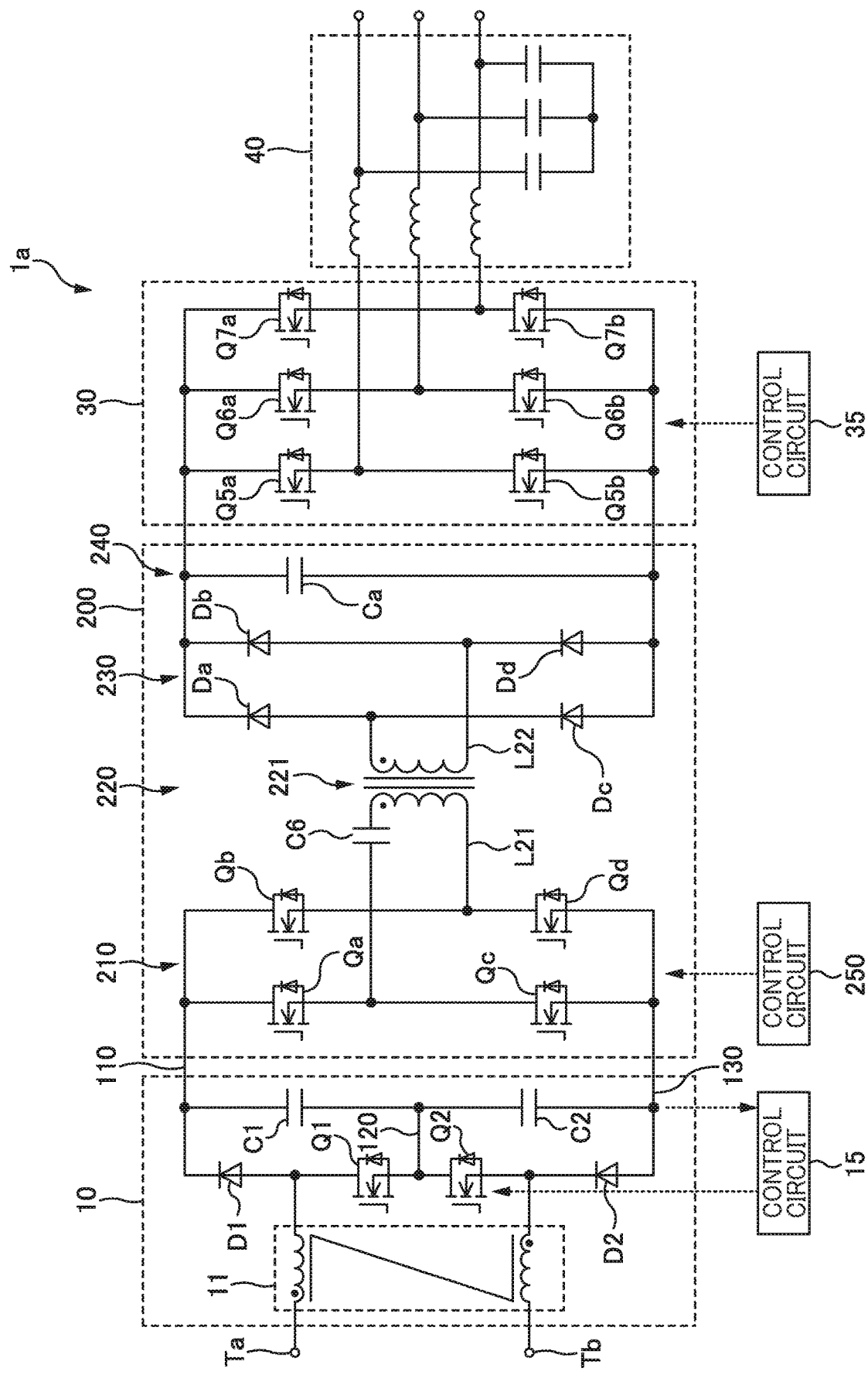
FIG. 1 is a circuit diagram illustrating a configuration of a power converter 1a in a comparative example.

FIG. 1 is a circuit diagram illustrating a configuration of a power converter 1a in a comparative example.

The power converter 1a of the comparative example includes a boost circuit 10, a resonant DC-DC converter 200, a three-phase inverter 30, and an LC filter 40. Terminals Ta and Tb illustrated in FIG. 1 are input terminals of an input voltage, and the terminal Ta is an input terminal on a high pressure side while the terminal Tb is an input terminal on a low pressure side. In a case of a rail vehicle, the terminal Ta is a pantograph while the terminal Tb is a wheel (a rail), and a DC input voltage at 750 V, for example, is applied between the terminal Ta and the terminal Tb. This input voltage is not constant and is varied in a range from 400 V to 1000 V.

==Boost Circuit 10==

The boost circuit 10 is a circuit that transforms (boosts) a varying input voltage into a constant voltage. With the boosting, a current is reduced, and a loss and heating can be suppressed. The boost circuit 10 is a three-level boost chopper that generates voltages at three levels based on the input voltage and applies the voltages to a first line 110, a second line 120, and a third line 130, respectively. The boost circuit 10 includes a coupling reactor 11, capacitors C1 and C2, diodes D1 and D2, switching elements Q1 and Q2, and a control circuit 15.

The capacitor C1 is coupled between the first line 110 and the second line 120, and the capacitor C2 is coupled between the second line 120 and the third line 130. In other words, the capacitor C1 and the capacitor C2 are coupled to each other in series.

The diode D1 and the switching element Q1 are coupled to each other in series between the first line 110 and the second line 120 (in other words, provided in parallel to the capacitor C1). A coupling point between the diode D1 and the switching element Q1 is coupled to the terminal Ta through the coupling reactor 11.

The diode D2 and the switching element Q2 are coupled to each other in series between the second line 120 and the third line 130 (in other words, provided in parallel to the capacitor C2). A coupling point between the diode D2 and the switching element Q2 is coupled to the terminal Tb through the coupling reactor 11.

An element having a withstand-voltage at 1200 V is used as the switching elements Q1 and Q2 and the diodes D1 and D2. The withstand-voltage is a rated voltage, and in a case of a MOSFET for example, it is determined that an operation between a source and a drain is performed within the withstand-voltage (here, 1200 V). That is, if a voltage exceeding the withstand-voltage is applied, there is a risk that the element may be broken.

The control circuit 15 monitors voltages of nodes of the capacitors C1 and C2 and controls switching of the switching elements Q1 and Q2.

Since the operations of this boost circuit 10 (a three-level boost chopper) are publicly known, detailed descriptions are omitted. For example, in accordance with the voltages of the capacitors C1 and C2, the control circuit 15 turns on and off the switching elements Q1 and Q2 alternately. Thus, accumulation and release of energy to and from the coupling reactor 11 are repeated, and the voltages of the capacitors C1 and C2 are controlled to be Vout/2, respectively; in this way, a boost operation is performed. Vout is an output voltage of the boost circuit 10 (a voltage between the first line 110 and the third line 130) and is a higher voltage than the input voltage.

For example, in a case where the input voltage at 750 V (450 to 1000 V) is boosted to obtain the output voltage Vout at 1100 V, a voltage applied to the first line 110 is Vout (1100 V), a voltage applied to the second line 120 is Vout/2 (550 V), and a voltage applied to the third line 130 is 0 V.

==Resonant DC-DC Converter 200==

The resonant DC-DC converter 200 is a circuit that isolates the output side from the input side. The resonant DC-DC converter 200 transforms the output of the boost circuit 10 (the DC voltage 1100 V) into a different DC voltage. The resonant DC-DC converter 200 is provided in a following stage of the boost circuit 10 and includes a bridge circuit 210, a resonant isolation circuit 220, a rectifier circuit 230, a smoothing circuit 240, and a control circuit 250.

The bridge circuit 210 is a circuit that converts the output voltage of the boost circuit 10 (the DC voltage 1100 V) into an AC voltage and includes switching elements Qa to Qd. The switching element Qa and the switching element Qc are coupled to each other in series between the first line 110 and the third line 130, and the switching element Qb and the switching element Qd are coupled to each other in series between the first line 110 and the third line 130.

One end of a primary winding L21 of an isolation transformer 221 described later is coupled to the coupling point between the switching element Qa and the switching element Qc through a resonant capacitor C6.

In the present embodiment, "coupling" is a state where members are connected to each other directly or indirectly to be conductible, and a state of the electrical coupling through the resonant capacitor C6 as described above is also referred to as coupling. The other end of the primary winding L21 of the isolation transformer 221 is coupled to the coupling point between the switching element Qb and the switching element Qd.

Out of the switching elements Qa to Qd included in the bridge circuit 210, the switching elements Qa and Qb are elements on the high side, and the switching elements Qc and Qd are elements on the low side.

The resonant isolation circuit 220 is a circuit forming an isolation portion in the resonant DC-DC converter 200 and includes the isolation transformer 221 and the resonant capacitor C6.

The isolation transformer 221 includes the primary winding L21 on a primary side on which magnetic flux is generated and a secondary winding L22 on a secondary side that is isolated from the primary winding L21 and also excited by the magnetic flux generated in the primary winding L21. As described above, one end of the primary winding L21 of the isolation transformer 221 is coupled to the bridge circuit 210 through the resonant capacitor C6. A leakage inductance of the isolation transformer 221 is used as a resonant inductance, and the resonant isolation circuit 220 forms a series resonant circuit in which the resonant capacitor C6 and the resonant inductance are coupled to each other in series.

The rectifier circuit 230 is a circuit that rectifies a voltage induced in the secondary winding L22 of the isolation transformer 221 and supplies the smoothing circuit 240 (a capacitor Ca) in a following stage with the rectified voltage. The rectifier circuit 230 is a full-wave rectifier circuit including four diodes Da to Dd.

The smoothing circuit 240 is a circuit that smooths an output of the rectifier circuit 230 to a direct current and includes the capacitor Ca in this case.

The control circuit 250 is a circuit that controls turn-on and turn-off of the switching elements Qa to Qd of the bridge circuit 210 by a predetermined duty cycle. Thus, it is possible to control a current flowing through the primary winding L21 of the isolation transformer 221. For example, when the switching elements Qa and Qd are turned on and the switching elements Qb and Qc are turned off, a current flows through a route of the switching element Qa→the resonant capacitor C6→the primary winding L21 of the isolation transformer 221→the switching element Qd (see the arrow of the solid line in FIG. 3).

On the other hand, when the switching elements Qa and Qd are turned off and the switching elements Qb and Qc are turned on, a current flows through a route of the switching element Qb→the primary winding L21 of the isolation transformer 221→the resonant capacitor C6→the switching element Qc (see an arrow of a broken line in FIG. 3). With the control circuit 250 controlling turn-on and turn-off of the switching elements Qa to Qd of the bridge circuit 210 as described above, a voltage is induced in the secondary winding L22 of the isolation transformer 221 and is made into a constant DC voltage by the rectifier circuit 230 and the smoothing circuit 240.

==Three-Phase Inverter 30==

The three-phase inverter 30 is a circuit that converts an output of the resonant DC-DC converter 200 into three-phase AC power required for in-vehicle facilities (an air conditioning device, a lighting device, and so on). The three-phase inverter 30 includes switching elements Q5a, Q5b, Q6a, Q6b, Q7a, and Q7b and a control circuit 35.

The switching elements Q5a, Q5b, Q6a, Q6b, Q7a, and Q7b form a three-phase full-bridge circuit. The switching elements Q5a, Q6a, and Q7a are switching elements on the high side, and the switching elements Q5b, Q6b, and Q7b are switching elements on the low side. As the switching elements Q5a, Q5b, Q6a, Q6b, Q7a, and Q7b, an element with a withstand-voltage at 1200 V is used as with the switching elements Q1 and Q2.

The control circuit 35 is a circuit that controls turn-on and turn-off of each of the switching elements Q5a, Q5b, Q6a, Q6b, Q7a, and Q7b of the three-phase inverter 30.

==LC Filter 40==

The LC filter 40 is a filter that removes a harmonic of an output of the three-phase inverter 30 and outputs an AC voltage.

With the above-described configuration, the varying input voltage (for example, 750 V of an overhead wire voltage) is boosted in the boost circuit 10 to a higher constant voltage (for example, 1100 V). The output of the boost circuit 10 is converted into an alternating current by the resonant DC-DC converter 200 and is thereafter transformed (step-down) into a DC voltage (for example, 700 V). Then, the DC voltage is converted into an AC voltage by the three-phase inverter 30 and outputted.

In a case of this comparative example, since the output of the boost circuit 10 is 1100 V, if an element with a withstand-voltage (1200 V) same as that of the other switching elements (the switching element Q1 and so on) is used as the switching elements Qa to Qd of the bridge circuit 210 of the resonant DC-DC converter 200, there is a risk that the element may be broken. For this reason, an element with a high withstand-voltage (for example, the withstand-voltage is 1700 V) needs to be used as the switching elements Qa to Qd of the bridge circuit 210.

However, with a use of such a switching element with a high withstand-voltage, as described later, it is difficult to perform a high-frequency operation (high-speed switching) since a response of turning off a small current is slow. Additionally, even with a use of the switching element with a high withstand-voltage, if the output of the boost circuit 10 (1100 V) is switched by the element, there is a risk of breakage due to a turn-off surge. Moreover, the switching element with a high withstand-voltage is expensive and costly. To deal with this, in the present embodiment, as described later, a configuration that does not need to use the switching element with a high withstand-voltage is applied. This allows for a stable operation.

First Embodiment

<<About Configuration of Power Converter>>

Figure 2:
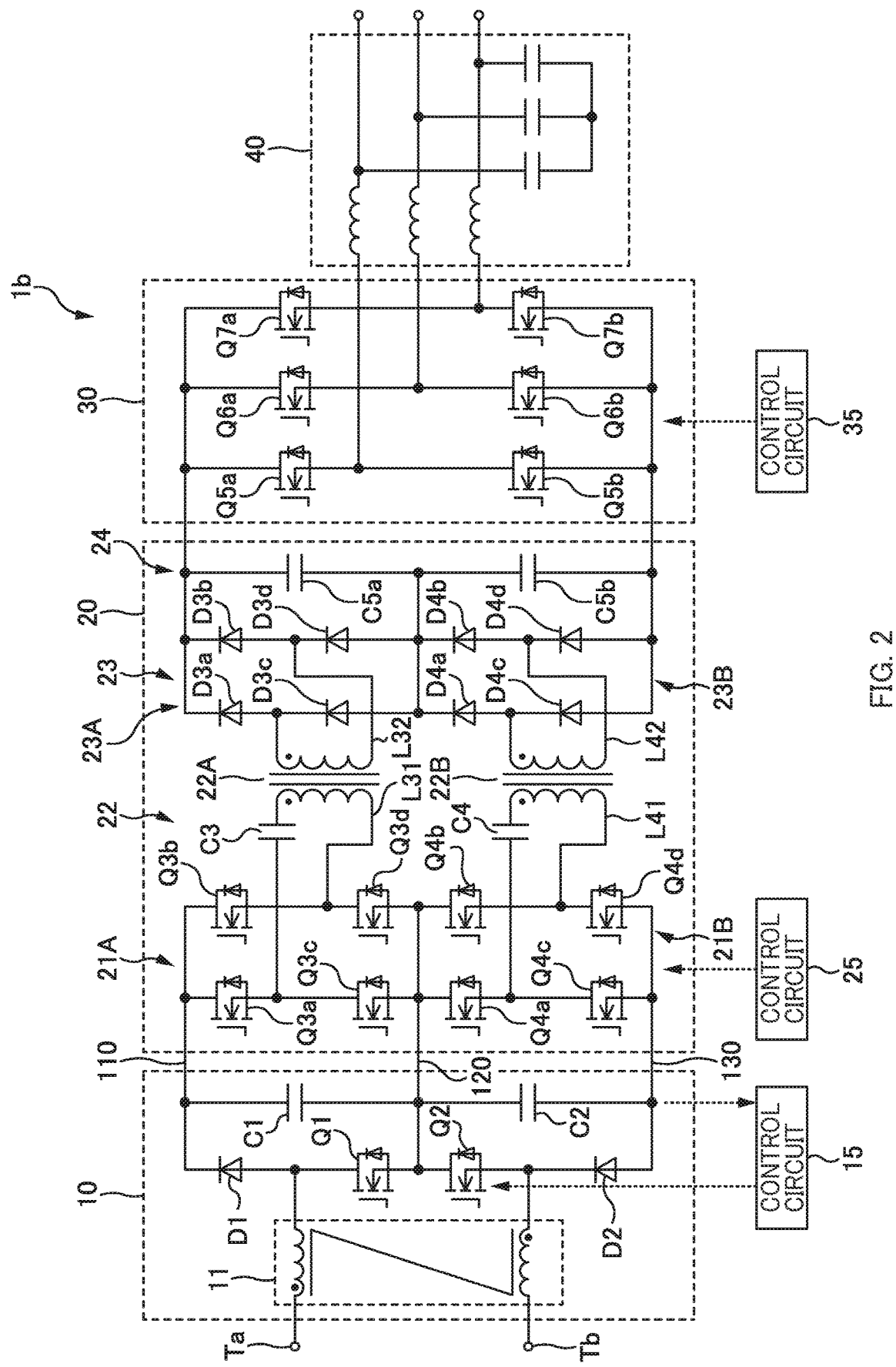
FIG. 2 is a circuit diagram illustrating a configuration of a power converter 1b in a first embodiment.

FIG. 2 is a circuit diagram illustrating a configuration of a power converter 1b of a first embodiment. A portion having the same configuration as that in the comparative example in FIG. 1 is marked with the same reference numeral, and the description is omitted. As illustrated in FIG. 2, in the present embodiment, the configuration of the resonant DC-DC converter is different from that in the comparative example.

The power converter 1b of the first embodiment includes the boost circuit 10, a resonant DC-DC converter 20, the three-phase inverter 30, and the LC filter 40.

==Boost Circuit 10==

The boost circuit 10 is a three-level boost chopper same as that in the comparative example and generates voltages at three levels based on the input voltage (750 V). The boost circuit 10 applies the highest voltage (for example, 1100 V) to the first line 110, applies a voltage at a middle level (for example, 550 V) to the second line 120, and applies the lowest voltage (for example, 0 V) to the third line 130. The boost circuit 10 corresponds to a "converter", the voltage applied to the first line 110 corresponds to a "first voltage", the voltage applied to the second line 120 corresponds to a "second voltage", and the voltage applied to the third line 130 corresponds to a "third voltage". Each of the switching elements Q1 and Q2 corresponds to a "third switching element".

==Resonant DC-DC Converter 20==

The resonant DC-DC converter 20 includes bridge circuits 21A and 21B, a resonant isolation circuit 22, a rectifier circuit 23, and a smoothing circuit 24. The resonant isolation circuit 22, the rectifier circuit 23, and the smoothing circuit 24 correspond to a "voltage output circuit". As with the comparative example, the resonant DC-DC converter 20 is a step-down converter, and the generated DC voltage (a predetermined voltage) is lower than the output voltage of the boost circuit 10. For example, the output voltage of the boost circuit 10 (the voltage between the first line 110 and the third line 130) is 1100 V, and the DC voltage generated by the resonant DC-DC converter 20 is 700 V.

The bridge circuit 21A is a circuit having a full-bridge configuration including switching elements Q3a to Q3d and is provided between the first line 110 and the second line 120. In other words, the bridge circuit 21A is provided in parallel to the capacitor C1 of the boost circuit 10. The bridge circuit 21A corresponds to a "first bridge circuit", and each of the switching elements Q3a to Q3d corresponds to a "first switching element".

The bridge circuit 21B is a circuit having a full-bridge configuration including switching elements Q4a to Q4d and is provided between the second line 120 and the third line 130. In other words, the bridge circuit 21B is provided in parallel to the capacitor C2 of the boost circuit 10. The bridge circuit 21B corresponds to a "second bridge circuit", and each of the switching elements Q4a to Q4d corresponds to a "second switching element".

The resonant isolation circuit 22 is a circuit forming an isolation portion in the resonant DC-DC converter 20 and includes isolation transformers 22A and 22B and resonant capacitors C3 and C4.

The isolation transformer 22A includes a primary winding L31 on the primary side on which magnetic flux is generated and a secondary winding L32 on the secondary side that is isolated from the primary winding L31 and also excited by the magnetic flux generated in the primary winding L31. The primary winding L31 of the isolation transformer 22A is coupled to the bridge circuit 21A through the resonant capacitor C3. In other words, the resonant capacitor C3 is coupled between the bridge circuit 21A and the primary winding L31 of the isolation transformer 22A. The isolation transformer 22A corresponds to a "first isolation transformer", and the resonant capacitor C3 corresponds to a "first resonant capacitor".

The isolation transformer 22B includes a primary winding L41 on the primary side on which magnetic flux is generated and a secondary winding L42 on the secondary side that is isolated from the primary winding L41 and also excited by the magnetic flux generated in the primary winding L41. The primary winding L41 of the isolation transformer 22B is coupled to the bridge circuit 21B through the resonant capacitor C4. In other words, the resonant capacitor C4 is coupled between the bridge circuit 21B and the primary winding L41 of the isolation transformer 22B. The isolation transformer 22B corresponds to a "second isolation transformer", and the resonant capacitor C4 corresponds to a "second resonant capacitor".

The rectifier circuit 23 includes a diode bridge circuit 23A and a diode bridge circuit 23B. The diode bridge circuit 23A is a full-wave rectifier circuit including diodes D3a to D3d that rectifies a voltage induced in the secondary winding L32 of the isolation transformer 22A and supplies a capacitor C5a described later with the rectified voltage. The diode bridge circuit 23B is a full-wave rectifier circuit including diodes D4a to D4d that rectifies a voltage induced in the secondary winding L42 of the isolation transformer 22B and supplies a capacitor C5b described later with the rectified voltage. The diode bridge circuit 23A corresponds to a "first diode bridge circuit", and the diode bridge circuit 23B corresponds to a "second diode bridge circuit".

The smoothing circuit 24 is a circuit that generates a constant (for example, 700 V) DC voltage by smoothing an output of the rectifier circuit 23. The smoothing circuit 24 of the present embodiment includes a capacitor C5a that smooths an output of the diode bridge circuit 23A and a capacitor C5b that smooths an output of the diode bridge circuit 23B, the capacitor C5a and the capacitor C5b being coupled to each other in series. The capacitor C5a corresponds to a "first capacitor", and the capacitor C5b corresponds to a "second capacitor".

A control circuit 25 of the present embodiment controls turn-on and turn-off of each of the switching elements Q3a to Q3d of the bridge circuit 21A and the switching elements Q4a to Q4d of the bridge circuit 21B. The control circuit 25 corresponds to a "control circuit".

The three-phase inverter 30 and the LC filter 40 have the same configurations as that in the comparative example. The three-phase inverter 30 corresponds to an "inverter", and each of the switching elements (Q5a, Q5b, Q6a, Q6b, Q7a, and Q7b) of the three-phase inverter 30 corresponds to a "fourth switching element".

As described above, the power converter of the present embodiment has a configuration in which two configurations similar to that of the resonant DC-DC converter 200 in the comparative example are arranged in series on the output side of the boost circuit 10 (double series configuration). This makes it possible to use an element with a lower withstand-voltage (for example, withstand-voltage 1200 V) than that of the switching elements Qa to Qd (withstand-voltage 1700 V) in the comparative example as the switching elements (the switching elements Q3a to Q3d and Q4a to Q4d) of the bridge circuits 21A and 21B, and, as described later, it is possible to implement a stable operation.

<<About Effectiveness>>

FIG. 3 is a diagram describing effectiveness of the present embodiment. Here, for the sake of expedience and simplification, combinations of a pair of the switching elements (on the high side and the low side) forming the bridge circuit are each described as switching elements (1) and (2) as illustrated in FIG. 3. The switching elements Q3a, Q3d, Q4a, and Q4d in the present embodiment correspond to the switching elements (1), and the switching elements Q3b, Q3c, Q4b, and Q4c correspond to the switching elements (2). The switching elements Qa and Qd in the comparative example correspond to the switching elements (1), and the switching elements Qb and Qc correspond to the switching elements (2). Each of the switching elements (1) and the switching elements (2) have the high side and the low side; however, here the high side is described for example.

In the waveform diagram of FIG. 3, on command indicates a gate voltage of the switching element, voltage indicates a voltage between a source and a drain, and current indicates a current flowing through the switching element.

In FIG. 3, a bold line indicates a waveform of the comparative example, and a narrow line indicates a waveform of the present embodiment. In reality, the magnitude of the voltage and the current in each element is different between the comparative example and the present embodiment; however, they are indicated by the same magnitude in FIG. 3.

As illustrated in FIG. 3, the switching elements (1) and the switching elements (2) are controlled to be turned on and off alternately. When the switching elements (1) are turned on (the switching elements (2) are turned off), a current flows in a direction indicated by an arrow of a solid line in FIG. 3. On the other hand, when the switching elements (2) are turned on (the switching elements (1) are turned off), a current flows in a direction indicated by the arrow of the broken line in FIG. 3. When each switching element is turned on, a current in the form of a sinusoidal waveform determined by a capacitor and a coil (LC) of a resonant circuit flows. A predetermined "dead time" is provided to prevent the switching elements (1) and the switching elements (2) from being turned on at the same time. In this dead time, a current flows through a parasitic diode (a body diode) or a diode coupled in inverse-parallel of the switching element.

In a normal operation, turn-off (switching from on to off) is performed when a current is small as illustrated in FIG. 3 so as to reduce a turn-off loss.

In the comparative example, 1100 V is applied to the bridge circuit; for this reason, the switching element with a high withstand-voltage (for example withstand-voltage 1700V) is used in the bridge circuit. As a result, in a case of turning off a small current with such a switching element with a high withstand-voltage, it takes time as indicated by the bold line in FIG. 3.

In contrast, in the present embodiment, the bridge circuit 21A and the bridge circuit 21B are arranged in series. Thus, a voltage applied to each of the bridge circuits 21A and 21B is 550 V and is smaller than that in a case of the comparative example. Therefore, it is possible to use an element with a lower withstand-voltage (for example, withstand-voltage 1200 V) than that in the comparative example as the switching elements (1) and (2) (specifically, the switching elements Q3a to Q3d and Q4a to Q4d). Since the low withstand-voltage element has a smaller size and parasitic capacitance than that of the high withstand-voltage element, it is possible to shorten the time required for shut-off for turn-off. Since the voltage between the lines (between the first line 110 and the second line 120 and between the second line 120 and the third line 130) is 550 V, each switching element has a sufficient withstand-voltage.

As described above, it is possible to shorten the dead time by turning off the power supply quickly, and this leads to a low loss and stability in operation. In other words, it is possible to implement a stable operation.

FIG. 4 is a diagram illustrating a case where a turn-off surge occurs. Here, also, the combinations of the pair of the switching elements (on the high side and the low side) forming the bridge circuit are each described as the switching elements (1) and (2) as illustrated in FIG. 4. In FIG. 4, a relationship between the on command (the gate voltage), the voltage (the source-drain voltage), and the current of the switching elements (1) are illustrated; however, a similar relationship is also applied to the switching elements (2).

In a case of stopping the switching elements (1) and (2), the switching elements (1) and (2) are not necessarily stopped in a timing in which the current is small. For example, if the switching elements (1) and (2) are stopped when the current is great in a timing of emergency stop or the like, a great turn-off surge (a surge voltage) occurs between the source and the drain as illustrated in FIG. 4.

In the comparative example, when the output of the boost circuit 10 is 1100 V, even with a use of the switching element with a high withstand-voltage (1700 V), there is a risk that the element may be broken due to the surge voltage. In order to prevent the surge voltage from exceeding the withstand-voltage of the switching element, a bus voltage needs to be low. If the bus voltage is low, it is difficult to make the input voltage into a constant voltage by the boost circuit 10.

In contrast, in the present embodiment, the series configuration of the bridge circuits using the element with the withstand-voltage of 1200 V is applied. The voltage between the lines is 550 V, and since there is only need of preventing the surge voltage from exceeding the withstand-voltage of the switching element (1200 V), the boost circuit 10 operates with a sufficient allowance to the voltage.

For example, even if the boost circuit 10 is boosted to a higher voltage than 1100 V, there is still a sufficient allowance to the voltage. With the boost circuit 10 being boosted to a high voltage, it is possible to reduce a conduction loss.

An element with the withstand-voltage of 1200 V is more inexpensive than the element with the withstand-voltage of 1700 V, and, additionally, it is possible to use an element with the same withstand-voltage as that of the switching elements of the other parts (the boost circuit 10 and the three-phase inverter 30). Specifically, the switching elements Q1, Q2, Q3a to Q3d, Q4a to Q4d, Q5a, Q5b, Q6a, Q6b, Q7a, and Q7b have the same withstand-voltage. In this case, "the same" withstand-voltage includes a difference that is allowed as a production tolerance and the like. That is, the withstand-voltages may not be strictly the same and may be substantially the same. With this, the types of the elements are not increased, and thus it is effective for management and procurement.

Each of the switching elements (at least the switching elements Q3a to Q3d and the switching elements Q4a to Q4) used in the power converter of the present embodiment is desirably formed of a wide-bandgap semiconductor. As the wide-bandgap semiconductor, a silicon carbide (SiC)-based semiconductor, a gallium nitride (GaN)-based semiconductor, and the like can be used. With a use of such a wide-bandgap semiconductor, it is possible to create an element with a high withstand-voltage with a low on-resistance. It is also possible to increase the switching speed and to reduce the switching loss. Note that, it is not limited to the wide-gap semiconductor, and a semiconductor such as an insulated gate bipolar transistor (IGBT), an Si-based MOSFET, and the like may be used, for example.

In the present embodiment, two switching elements coupled to each other in series are stored in a predetermined package (to be a module).

Figure 5:
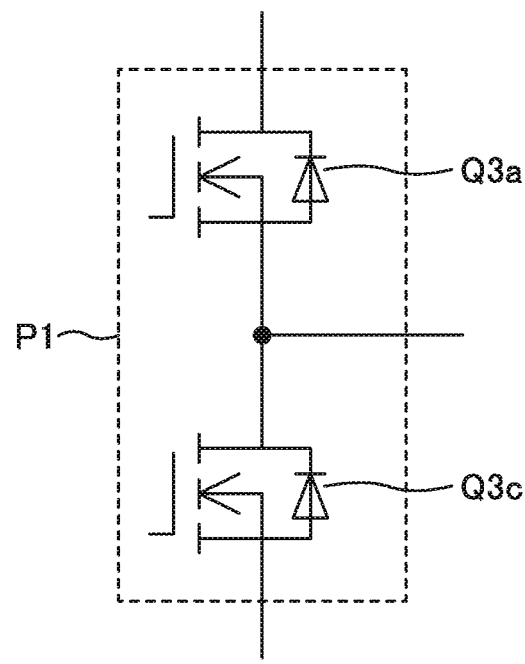
FIG. 5 is an explanatory diagram of storage into a package.

FIG. 5 is an explanatory diagram of storage into a package. As illustrated in FIG. 5, a set of Q3a on the high side and Q3c on the low side (a set of the two switching elements) is stored in a package P1. Although it is not illustrated, each pair of the switching elements Q3b and Q3d, the switching elements Q4a and Q4c, the switching elements Q4b and Q4d, the switching elements Q5a and Q5b, the switching elements Q6a and Q6b, and the switching elements Q7a and Q7b is also stored in a similar package as the package P1. With those switching elements having the same withstand-voltage, procurement and management are simplified.

Each of the diode D1 and the diode D2 of the boost circuit 10 may be formed of a switching element. In this case, the functions of the diodes D1 and D2 can be implemented by turning off the above-described switching element and using the parasitic diode (a body diode) or the diode coupled in inverse-parallel of the switching element. In this case, also, with each pair of the two switching elements coupled to each other in series in the boost circuit 10 (a pair of the switching element Q1 and the switching element corresponding to the diode D1 and a pair of the switching element Q2 and the switching element corresponding to the diode D2) being stored in a predetermined package, procurement and management are further simplified.

<<Modification of First Embodiment>>

Figure 6:
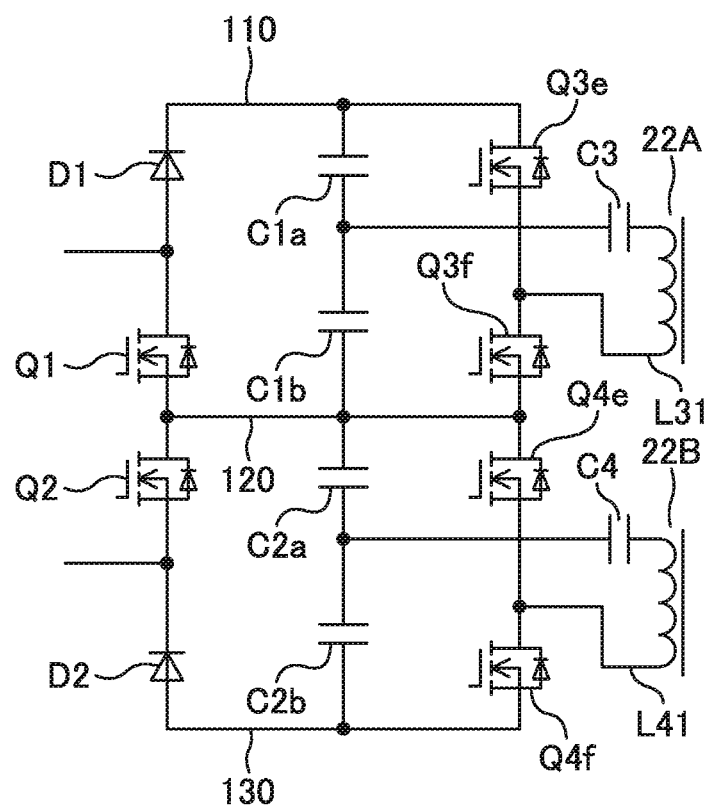
FIG. 6 is an explanatory diagram of a modification of the first embodiment.

FIG. 6 is an explanatory diagram of a modification of the first embodiment. FIG. 6 illustrates a part of the input side of the power converter, and a portion having the same configuration as that in FIG. 2 is marked with the same reference numeral, and the description is omitted. In the above-described first embodiment, each of the bridge circuits 21A and 21B is a full-bridge. On the other hand, in this modification, the bridge circuits 21A and 21B are half-bridges including the switching elements Q3e and Q3f and the switching elements Q4e and Q4f, respectively. In this case, four capacitors in the boost circuit 10 may be arranged in series (four capacitors C1a, C1b, C2a, and C2b in series).

Also in a case of this modification, similar effects can be obtained.

In the first embodiment, each of the diode bridge circuits 23A and 23B of the rectifier circuit 23 is a full-wave rectifier circuit; however, it is not limited thereto, and each of the diode bridge circuits 23A and 23B may be a half-wave rectifier circuit.

Second Embodiment

In a second embodiment, the configuration of the output side of the resonant DC-DC converter 20 (the rectifier circuit and the smoothing circuit) is different from that in the first embodiment.

FIG. 7 is a circuit diagram and a waveform diagram illustrating a part of a configuration of a power converter 1c in the second embodiment, and FIGS. 8A to 8D are explanatory diagrams of rectifying operations in the second embodiment. Waveforms in FIG. 7 schematically illustrate the operations, and the transient state of the current of the switching element during the switching from turn-on to turn-off illustrated in FIG. 3 is omitted. Likewise, the transient state during the switching from turn-on to turn-off is omitted also in the diagrams describing the other following embodiments.

In FIG. 7, for the sake of description, the switching elements of the bridge circuits 21A and 21B are switching elements (1), (2), (3), and (4), and the diodes included in the diode bridge circuit on the output side are diodes (5), (6), (7), and (8). Specifically, the switching elements Q3a and Q3d of the bridge circuit 21A correspond to the switching elements (1), and the switching elements Q3b and Q3c correspond to the switching elements (2). The switching elements Q4a and Q4d of the bridge circuit 21B correspond to the switching elements (3), and the switching elements Q4b and Q4c correspond to the switching elements (4). The diodes D3a and D3d of the diode bridge circuit 23A correspond to the diodes (5), and the diodes D3b and D3c correspond to the diodes (6). The diodes D4a and D4d of the diode bridge circuit 23B correspond to the diodes (7), and the diodes D4b and D4c correspond to the diodes (8). The diodes (5), (6), (7), and (8) are each provided in pair to form a full-wave rectifier diode bridge circuit.

As illustrated in FIG. 7, the power converter 1c of the second embodiment includes a rectifier circuit 231 and a smoothing circuit 241.

The smoothing circuit 241 of the second embodiment includes a single capacitor (a capacitor C5).

The rectifier circuit 231 includes a diode bridge circuit including the two diodes (5) and the two diodes (6) and a diode bridge circuit including the two diodes (7) and the two diodes (8), and those diode bridge circuits are provided in parallel to the capacitor C5.

The diode bridge circuit including the two diodes (5) and the two diodes (6) is a circuit (a full-wave rectifier circuit) that rectifies the voltage induced in the secondary winding L32 of the isolation transformer 22A and supplies the capacitor C5 with the rectified voltage, and the diode bridge circuit corresponds to the "first diode bridge circuit".

The diode bridge circuit including the two diodes (7) and the two diodes (8) is a circuit (a full-wave rectifier circuit) that rectifies the voltage induced in the secondary winding L42 of the isolation transformer 22B and supplies the capacitor C5 with the rectified voltage, and the diode bridge circuit corresponds to the "second diode bridge circuit".

Figure 8A:
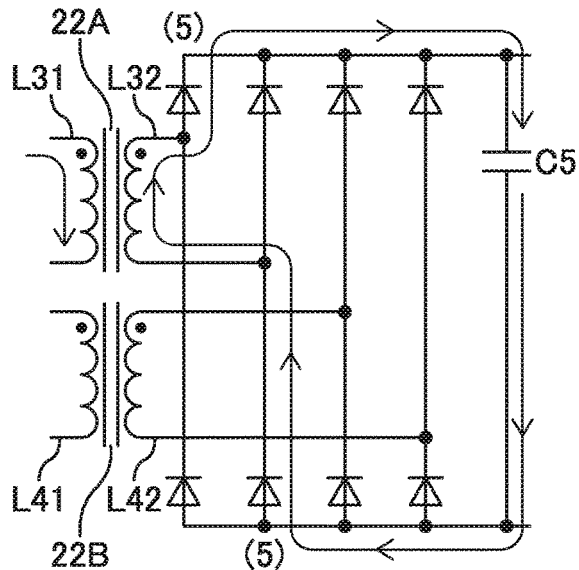
FIGS. 8A to 8D are explanatory diagrams of rectifying operations in the second embodiment.
Figure 8C:
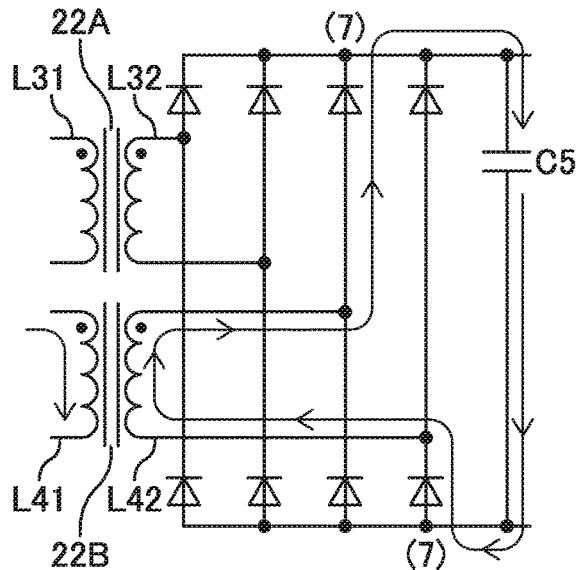
Figure 8B:
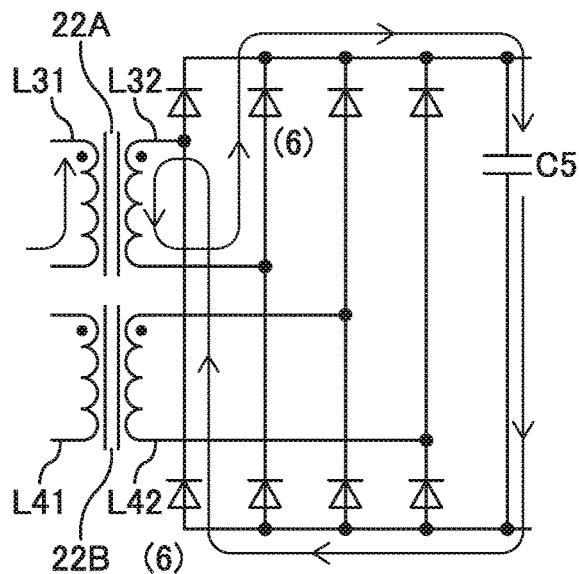

With the switching elements (1) and (2) being switched alternately, a current flows through the diodes (5) and (6) alternately as illustrated in FIGS. 8A and 8B and charges the capacitor C5. Specifically, when the switching elements (1) are turned on while the switching elements (2) are turned off, a current flows through the diodes (5) as illustrated in FIG. 8A (and FIG. 7). When the switching elements (2) are turned on while the switching elements (1) are turned off, a current flows through the diodes (6) as illustrated in FIG. 8B (and FIG. 7).

Figure 8D:
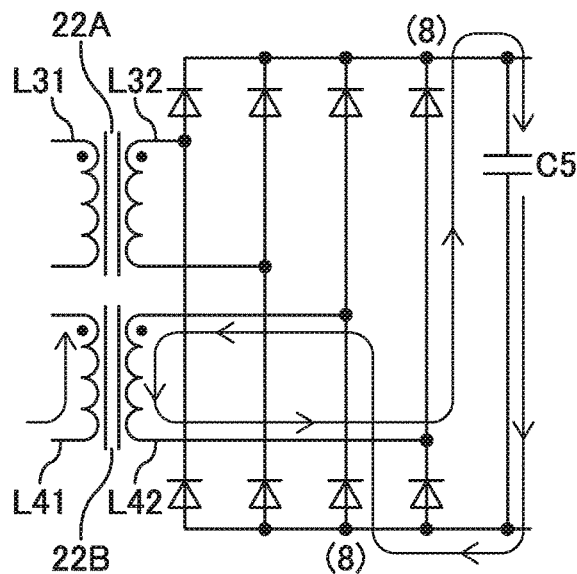

Likewise, also in a case of alternately switching the switching elements (3) and (4), a current flows through the diodes (7) and (8) alternately as illustrated in FIGS. 8C and 8D and charges the capacitor C5. Specifically, when the switching elements (3) are turned on while the switching elements (4) are turned off, a current flows through the diodes (7) as illustrated in FIG. 8C. When the switching elements (4) are turned on while the switching elements (3) are turned off, a current flows through the diodes (8) as illustrated in FIG. 8D.

If the timings of the on commands of the switching elements (1) and (3) and the switching elements (2) and (4) coincide with each other, the currents flow through the diodes (5) and (7) and the diodes (6) and (8) in the same timing. On the other hand, if the timings of the on commands of the switching elements (1) and (3) and the switching elements (2) and (4) are the different from each other, timings of conduction of the diodes (5) and (7) and the diodes (6) and (8) (timings of the flowing currents) are different from each other.

Note that, since the flow paths of the diodes (5) and (7) and the diodes (6) and (8) are separated from each other (the capacitor C5 is charged through each flow path), the timings of conduction may be allowed to be different. In order to make the timings of the currents of the diodes (5) and (7) and the diodes (6) and (8) different from each other to average the currents flowing through the capacitor C5, it is favorable that phases of the diodes (5) and (7) (and the diodes (6) and (8)) are different from each other by 90°. In other words, it is favorable that the on commands of the switching elements (1) and (3) and the switching elements (2) and (4) are different from each other by 90°.

Since the full-wave rectifying is applied in this example, the current flowing through each of the diodes (5) to (8) is small.

As described above, in the second embodiment, a configuration in which full-wave rectifier diode bridge circuits are provided in parallel to each other is applied. Also in this case, it is possible to obtain similar effects as that of the first embodiment.

Third Embodiment

FIG. 9 is a circuit diagram and a waveform diagram illustrating a configuration of a power converter 1d of a third embodiment. FIGS. 10A to 10D are explanatory diagrams of rectifying operations in the third embodiment. In the third embodiment, a configuration in which half-wave rectifier diode bridge circuits are provided in parallel to each other is applied.

Also in FIG. 9, for the sake of description, as with FIG. 3, the switching elements of the bridge circuits 21A and 21B are the switching elements (1), (2), (3), and (4), and the diodes included in the diode bridge on the output side are the diodes (5), (6), (7), and (8). The switching elements (1), (2), (3), and (4) are the same as that in the second embodiment.

In the third embodiment, the diode D3a corresponds to the diode (5), and the diode D3c corresponds to the diode (6). The diode D4a corresponds to the diode (7), and the diode D4c corresponds to the diode (8). In the third embodiment, the smoothing circuit 24 (the capacitors C5a and C5b coupled to each other in series) same as that in the first embodiment is used. Each of the capacitor C5a and the capacitor C5b corresponds to a "capacitor".

A rectifier circuit 232 of the third embodiment is provided with each one of the diodes (5), (6), (7), and (8), and those diodes form the diode bridge circuit (the half-wave rectifier circuit).

In the rectifier circuit 232, the diode bridge circuit including the diode (5) is a circuit that rectifies the voltage induced in the secondary winding L32 of the isolation transformer 22A and supplies the capacitor C5a with the rectified voltage, and the diode bridge circuit corresponds to the "first diode bridge circuit". The diode bridge circuit including the diode (7) is a circuit that rectifies the voltage induced in the secondary winding L42 of the isolation transformer 22B and supplies the capacitor C5a with the rectified voltage, and the diode bridge circuit corresponds to the "second diode bridge circuit".

The diode bridge circuit including the diode (6) is a circuit that rectifies the voltage induced in the secondary winding L32 of the isolation transformer 22A and supplies the capacitor C5b with the rectified voltage, and the diode bridge circuit corresponds to the "first diode bridge circuit". The diode bridge circuit including the diode (8) is a circuit that rectifies the voltage induced in the secondary winding L42 of the isolation transformer 22B and supplies the capacitor C5b with the rectified voltage, and the diode bridge circuit corresponds to the "second diode bridge circuit".

Figure 10A:
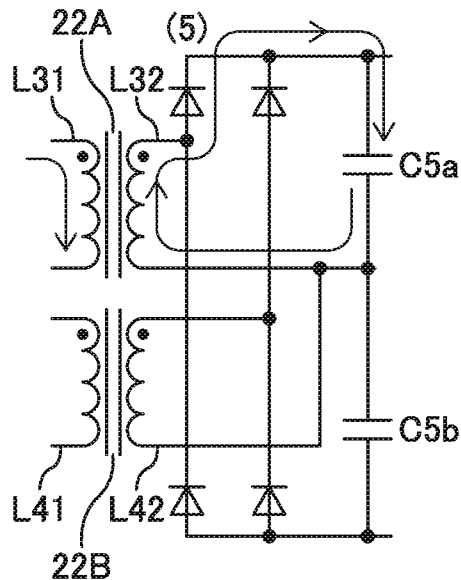
FIG. 10A to 10D are explanatory diagrams of rectifying operations in the third embodiment.
Figure 10B:
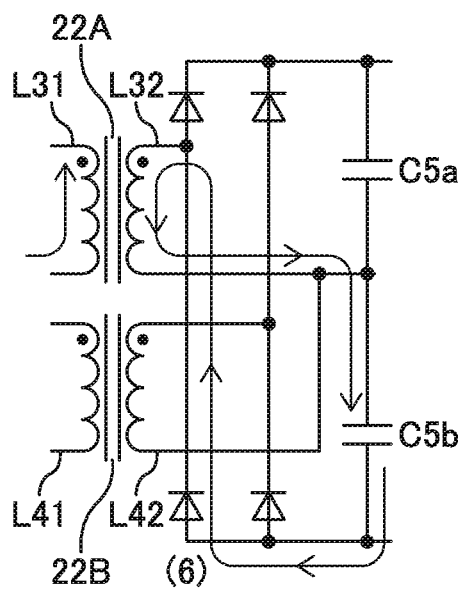

When the switching elements (1) and (2) are switched alternately, a current flows through the diodes (5) and (6) alternately as illustrated in FIGS. 10A and 10B. Specifically, when the switching elements (1) are turned on while the switching elements (2) are turned off, a current flows through the diode (5) as illustrated in FIG. 10A (and FIG. 9) and charges the capacitor C5a. When the switching elements (2) are turned on while the switching elements (1) are turned off, a current flows through the diode (6) as illustrated in FIG. 10B (and FIG. 9) and charges the capacitor C5b.

Figure 10C:
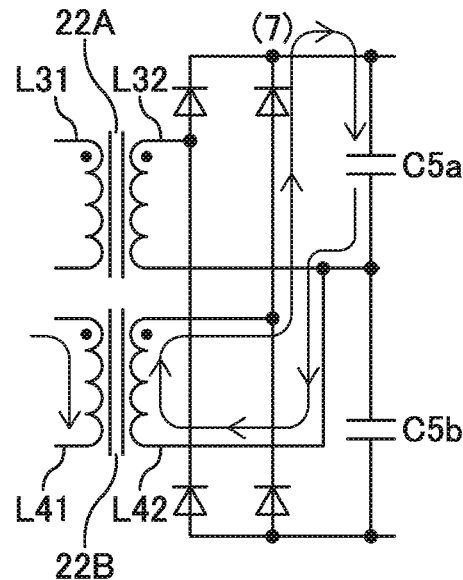
Figure 10D:
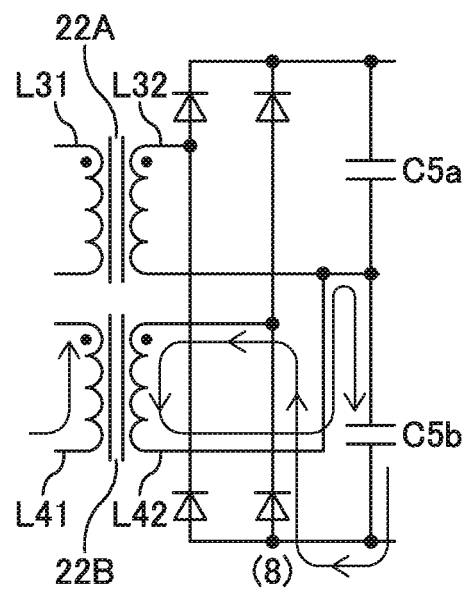

Likewise, also in a case of alternately switching the switching elements (3) and (4), a current flows through the diodes (7) and (8) alternately as illustrated in FIGS. 10C and 10D. Specifically, when the switching elements (3) are turned on while the switching elements (4) are turned off, a current flows through the diode (7) as illustrated in FIG. 10C and charges the capacitor C5a. When the switching elements (4) are turned on while the switching elements (3) are turned off, a current flows through the diode (8) as illustrated in FIG. 10D and charges the capacitor C5b.

If the timings of the commands of the switching elements (1) and (3) as well as (2) and (4) substantially coincide with each other, the timings of the currents flowing through the diodes (5) and (6) along with the driving of the switching elements (1) and (2) and the currents flowing through the diodes (7) and (8) along with the driving of the switching elements (3) and (4) are substantially the same timings. If the timings of the commands of the switching elements (1) and (3) as well as (2) and (4) are different from each other, the timings of conduction of the diodes (5) and (7) and the diodes (6) and (8) are different from each other.

Note that, since the flow paths of the diodes (5) and (7) and (6) and (8) are separated from each other, there is no problem even if the timings are different.

In order to make the timings of the currents of the diodes (5) and (7) and the diodes (6) and (8) different from each other to average the currents flowing through the respective capacitors (the capacitors C5a and C5b), it is favorable that the phases of the diodes (5) and (7) (and the diodes (6) and (8)) are different from each other by 180°. In other words, it is favorable that the on commands of the switching elements (1) and (3) and the switching elements (2) and (4) are different from each other by 180°.

Since the diode bridge circuit of the rectifier circuit 232 of this third embodiment is a half-wave rectifier circuit, the number of the diodes is less than that of the second embodiment. Therefore, the current flowing through each diode is great, but the number of parts (the number of packages) can be reduced.

<<Modification of Third Embodiment>>

Figure 11:
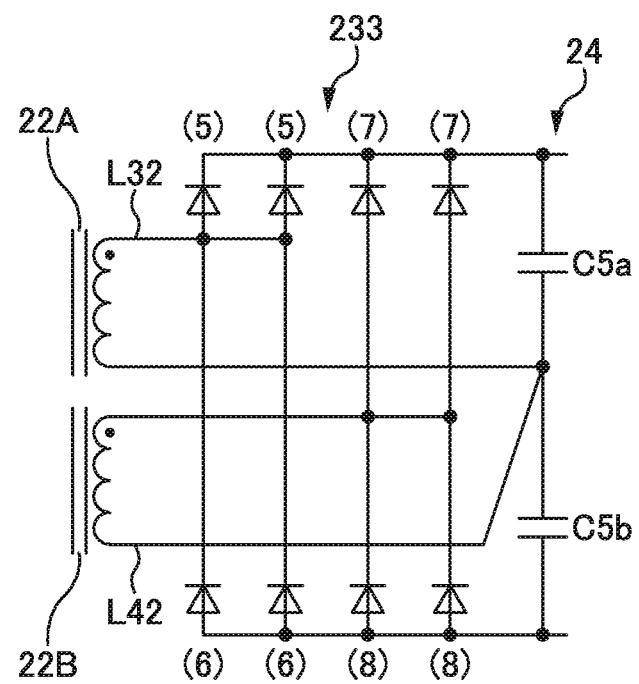
FIG. 11 is an explanatory diagram of a modification of the third embodiment.

FIG. 11 is an explanatory diagram of a modification of the third embodiment. Here are illustrated only the referred portions. In a rectifier circuit 233 of this modification, the diode bridges of the diodes (5) to (8) are provided in two in parallel to each other. Also in this modification, the diode D3a corresponds to the diode (5), and the diode D3c corresponds to the diode (6). The diode D4a corresponds to the diode (7), and the diode D4c corresponds to the diode (8). In this case, compared with the third embodiment (FIG. 9), the number of the diodes is double, but the current flowing through each diode can be reduced.

Fourth Embodiment

FIG. 12 is a circuit diagram and a waveform diagram illustrating a part of a configuration of a power converter 1e of a fourth embodiment.

Also in FIG. 12, as with FIG. 3, the switching elements of the bridge circuits 21A and 21B are the switching elements (1), (2), (3), and (4), and the diodes included in the diode bridge on the output side are the diodes (5) and (6). The switching elements (1), (2), (3), and (4) are the same as that in the second embodiment. In the fourth embodiment, the diodes D3a and D3d and the diodes D4a and D4d correspond to the diodes (5), and the diodes D3b and D3c and the diodes D4b and D4c correspond to the diodes (6).

The power converter 1e of the fourth embodiment includes a rectifier circuit 234 and the smoothing circuit 241.

The smoothing circuit 241 is the same as that in the second embodiment and includes the capacitor C5. The capacitor C5 corresponds to the "capacitor".

The rectifier circuit 234 includes the two diodes (5) and the two diodes (6), and these four diodes form the diode bridge circuit (the full-wave rectifier circuit). The secondary winding L32 of the isolation transformer 22A and the secondary winding L42 of the isolation transformer 22B are coupled to this diode bridge circuit mutually. This diode bridge circuit corresponds to a "diode bridge circuit" that rectifies the voltage induced in the secondary winding L32 of the isolation transformer 22A and the secondary winding L42 of the isolation transformer 22B.

When the switching elements (1) and (2) are switched alternately, a current flows through the diodes (5) and (6) alternately and charges the capacitor C5. Specifically, when the switching elements (1) are turned on (the switching elements (2) are turned off), a current flows through the diodes (5), and when the switching elements (2) are turned on (the switching elements (1) are turned off), a current flows through the diodes (6).

Also when the switching elements (3) and (4) are switched alternately, a current flows through the diodes (5) and (6) alternately and charges the capacitor C5. Specifically, when the switching elements (3) are turned on (the switching elements (4) are turned off), a current flows through the diodes (5), and when the switching elements (4) are turned on (the switching elements (3) are turned off), a current flows through the diodes (6).

If the timings of the on commands of the switching elements (1) and (3) as well as (2) and (4) substantially coincide with each other (when the phase difference is 0°), the timings in which the currents flow through the diodes (5) along with the driving of the switching elements (1) and (3) are substantially the same. Additionally, the timings in which the currents flow through the diodes (6) along with the driving of the switching elements (2) and (4) are substantially the same. In other words, the diode (5) and the diode (6) never become conductive at the same time. When the timings of the on commands of the switching elements (1) and (3) as well as (2) and (4) are different greatly and the currents are likely to flow through the diodes (5) and (6) at the same time, short circuit occurs and the concurrent conduction is not established.

Therefore, in the fourth embodiment, the switching elements (1) and (3) as well as (2) and (4) are each switching-controlled such that the timings to be turned on are the same. In other words, the control circuit 25 of the fourth embodiment controls switching of the switching elements of the bridge circuit 21A and the bridge circuit 21B such that the voltages applied to the respective primary windings (L31 and L41) of the isolation transformers 22A and 22B are in phase.

In the case of the fourth embodiment, the diode bridge circuit including the diodes (5) and (6) is a full-wave rectifier circuit, and since the current based on the driving of the switching elements (1) and (3) and the current based on the driving of the switching elements (2) and (4) are overlapped, the current flowing through each diode is greater than that of the second embodiment (FIG. 7). However, the number of the elements can be reduced compared with the second embodiment.

<<Modification of Fourth Embodiment>>

Figure 13:
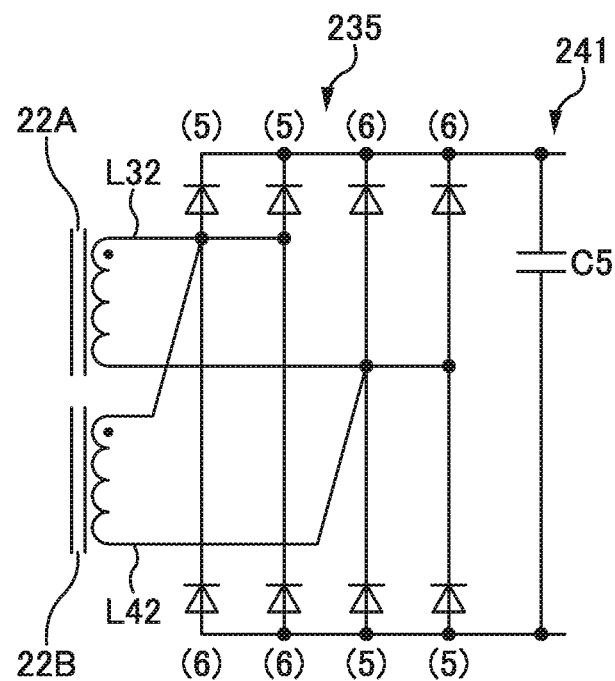
FIG. 13 is an explanatory diagram of a modification of the fourth embodiment.

FIG. 13 is an explanatory diagram of a modification of the fourth embodiment. Here are illustrated only the modified portions. In a rectifier circuit 235 of this modification, two combinations of the diode bridges of the diodes (5) and (6) are provided in parallel to each other. Also in this modification, the diodes D3$a$ and D3$d$ and the diodes D4$a$ and D4$d$ correspond to the diodes (5), and the diodes D3$b$ and D3$c$ and the diodes D4$b$ and D4$c$ correspond to the diodes (6). In a case of this modification, the current flowing through each diode can be reduced compared with the fourth embodiment.

Fifth Embodiment

FIG. 14 is a circuit diagram and a waveform diagram illustrating a part of a configuration of a power converter if of a fifth embodiment. This fifth embodiment is different from the fourth embodiment in that the diode bridge circuit is a half-wave rectifier circuit.

Also in FIG. 14, as with FIG. 3, the switching elements of the bridge circuits 21A and 21B are the switching elements (1), (2), (3), and (4), and the diodes included in the diode bridge on the output side are the diodes (5) and (6). The switching elements (1), (2), (3), and (4) are the same as that in the second embodiment. In the fifth embodiment, the diode D3$a$ and the diode D4$a$ correspond to the diode (5), and the diode D3$c$ and the diode D4$c$ correspond to the diode (6).

In the fifth embodiment, a rectifier circuit 236 and the smoothing circuit 24 are provided.

The smoothing circuit 24 is the same as that in the first embodiment and the third embodiment and includes the capacitor C5$a$ and the capacitor C5$b$ coupled to each other in series. The capacitor C5$a$ corresponds to the "first capacitor", and the capacitor C5$b$ corresponds to the "second capacitor".

The rectifier circuit 236 is provided with each one of the diodes (5) and (6). The diode (5) and the diode (6) are coupled to each other in series and provided in parallel to the capacitors C5$a$ and C5$b$ coupled to each other in series. The coupling point between the diode (5) and the diode (6) is coupled with one end of the secondary winding L32 of the isolation transformer 22A and one end of the secondary winding L42 of the isolation transformer 22B, and the coupling point between the capacitor C5$a$ and the capacitor C5$b$ is coupled with the other end of the secondary winding L32 of the isolation transformer 22A and the other end of the secondary winding L42 of the isolation transformer 22B.

The diode bridge circuit including the diode (5) rectifies the voltage induced in the secondary winding L32 of the isolation transformer 22A and the secondary winding L42 of the isolation transformer 22B and supplies the capacitor C5$a$ with the rectified voltage. In other words, this diode bridge circuit corresponds to the "first diode bridge circuit".

The diode bridge circuit including the diode (6) rectifies the voltage induced in the secondary winding L32 of the isolation transformer 22A and the secondary winding L42 of the isolation transformer 22B and supplies the capacitor C5$b$ with the rectified voltage. In other words, this diode bridge circuit corresponds to the "second diode bridge circuit".

When the switching elements (1) and (2) are switched alternately, a current flows through the diodes (5) and (6) alternately and charges each of the capacitor C5$a$ and the capacitor C5$b$. Specifically, when the switching elements (1) are turned on (the switching elements (2) are turned off), a current flows through the diode (5) and charges the capacitor C5$a$, and when the switching elements (2) are turned on (the switching elements (1) are turned off), a current flows through the diode (6) and charges the capacitor C5$b$.

Also in a case of switching the switching elements (3) and (4) alternately, a current flows through the diode (5) and (6) alternately and charges each of the capacitor C5$a$ and the capacitor C5$b$. Specifically, when the switching elements (3) are turned on (the switching elements (4) are turned off), a current flows through the diode (5) and charges the capacitor C5$a$, and when the switching elements (4) are turned on (the switching elements (3) are turned off), a current flows through the diode (6) and charges the capacitor C5$b$.

When the timings of the on commands of the switching elements (1) and (3) as well as (2) and (4) substantially coincide with each other (when the phase difference is 0°), the timings in which the currents flow through the diode (5) along with the driving of the switching elements (1) and (3) are substantially the same. Additionally, the timings in which the currents flow through the diode (6) along with the driving of the switching elements (2) and (4) are substantially the same. In other words, the diode (5) and the diode (6) never become conductive at the same time. When the difference between the timings of the on commands of the switching elements (1) and (3) as well as (2) and (4) is great and the currents are likely to flow through the diodes (5) and (6) at the same time, short circuit occurs and the concurrent conduction is not established.

Therefore, also in the fifth embodiment, as with the fourth embodiment, the switching elements (1) and (3) as well as (2) and (4) are each switching-controlled such that the timings to be turned on are the same. In other words, the control circuit 25 controls switching of the switching elements of the bridge circuit 21A and the bridge circuit 21B such that the voltages applied to the respective primary windings (L31 and L41) of the isolation transformers 22A and 22B are in phase.

In the case of the fifth embodiment, since the current based on the driving of the switching elements (1) and (3) and the current based on the driving of the switching elements (2) and (4) are overlapped, the current flowing through each diode is greater than that in the third embodiment (the half-wave rectifier circuit); however, the number of the elements (the diodes) can be reduced compared with the third embodiment.

<<Modification of Fifth Embodiment>>

Figure 15:
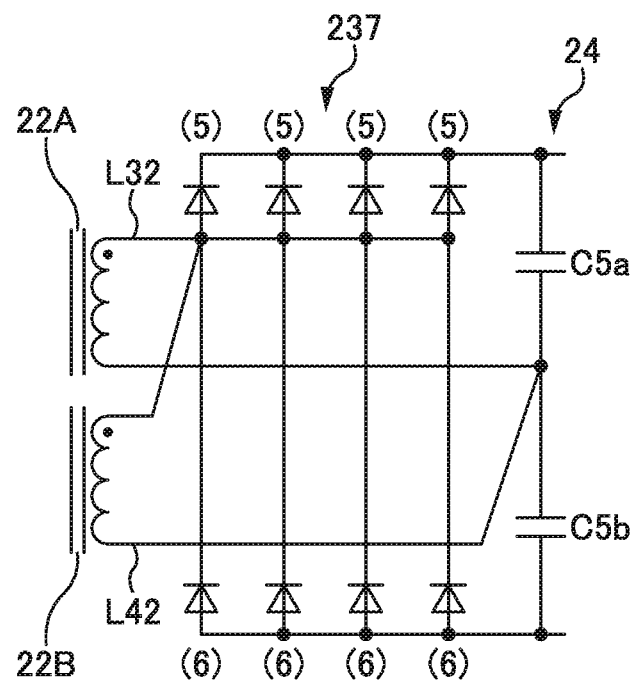
FIG. 15 is an explanatory diagram of a modification of the fifth embodiment.

FIG. 15 is an explanatory diagram of a modification of the fifth embodiment. Here are illustrated only the modified portions. In a rectifier circuit 237 of this modification, four combinations of the diode bridge of the diodes (5) and (6) are provided in parallel to each other. Also in this modification, the diode D3a and diode D4a correspond to the diodes (5), and the diode D3c and diode D4c correspond to the diodes (6). In a case of this modification, compared with the fifth embodiment, the current flowing through each element can be reduced, and the loss in each element can be reduced. In FIG. 15, the current and the loss in each element are substantially equal to that of the embodiments illustrated in FIGS. 7, 8A to 8D, 11, and 13.

Sixth Embodiment

FIGS. 16A to 16F are explanatory diagrams of a sixth embodiment. In the sixth embodiment, the diodes forming the diode bridge circuit are coupled to each other in anti-series.

FIGS. 16A and 16B are diagrams illustrating an example where the diode bridge circuits including the diodes in anti-series are arranged in series. Here is used the smoothing circuit 24 (the capacitor C5a and the capacitor C5b) as a smoothing circuit. As with the above-described embodiments, the diodes included in the diode bridge on the output side are the diodes (5), (6), (7), and (8). The diodes D3a and D3d correspond to the diode (5), the diodes D3b and D3c correspond to the diode (6), the diodes D4a and D4d correspond to the diode (7), and the diodes D4b and D4c correspond to the diode (8).

For example, in a case of FIG. 16A, an anode of the diode (5) is coupled to one end of the secondary winding L32 of the isolation transformer 22A, an anode of the diode (6) is coupled to the other end of the secondary winding L32, and cathodes of the diode (5) and the diode (6) are coupled to each other while being coupled to one end of the capacitor C5a. A midpoint of the secondary winding L32 of the isolation transformer 22A is coupled to the other end of the capacitor C5a.

An anode of the diode (7) is coupled to one end of the secondary winding L42 of the isolation transformer 22B, an anode of the diode (8) is coupled to the other end of the secondary winding L42, and cathodes of the diode (7) and the diode (8) are coupled to each other while being coupled to one end of the capacitor C5b. A midpoint of the secondary winding L42 of the isolation transformer 22B is coupled to the other end of the capacitor C5b.

In FIG. 16B, the polarity of each diode (the anode and the cathode) and the coupling relationship to each of the capacitors C5a and C5b are inverse of FIG. 16A.

FIGS. 16C and 16D are diagrams illustrating an example where the diode bridge circuits including the diodes in anti-series are arranged in parallel to each other. In this example, the smoothing circuit 241 (the capacitor C5) is used as a smoothing circuit. The diodes included in the diode bridge are the diodes (5), (6), (7), and (8). The diodes D3a and D3d correspond to the diode (5), the diodes D3b and D3c correspond to the diode (6), the diodes D4a and D4d correspond to the diode (7), and the diodes D4b and D4c correspond to the diode (8).

For example, in a case of FIG. 16C, the anode of the diode (5) is coupled to one end of the secondary winding L32 of the isolation transformer 22A, the anode of the diode (6) is coupled to the other end of the secondary winding L32, and the cathodes of the diode (5) and the diode (6) are coupled to each other while being coupled to one end of the capacitor C5.

The anode of the diode (7) is coupled to one end of the secondary winding L42 of the isolation transformer 22B, the anode of the diode (8) is coupled to the other end of the secondary winding L42, and the cathodes of the diode (7) and the diode (8) are coupled to each other while being coupled to one end of the capacitor C5.

Additionally, the midpoint of the secondary winding L32 of the isolation transformer 22A and the midpoint of the secondary winding L42 of the isolation transformer 22B are coupled to the other end of the capacitor C5.

In FIG. 16D, the polarity of each diode (the anode and the cathode) and the coupling relationship to the capacitor C5 are inverse of FIG. 16C.

FIGS. 16E and 16F are diagrams illustrating an example where the diode bridge including the diodes in anti-series is shared in parallel. Also in this example, the smoothing circuit 241 (the capacitor C5) is used as a smoothing circuit. The diodes included in the diode bridge are the diodes (5) and (6). The diodes D3a, D3d, D4a, and D4d correspond to the diode (5), and the diodes D3b, D3c, D4b, and D4c correspond to the diode (6).

For example, in a case of FIG. 16E, the anode of the diode (5) is coupled to one end of the secondary winding L32 of the isolation transformer 22A and one end of the secondary winding L42 of the isolation transformer 22B, and the anode of the diode (6) is coupled to the other end of the secondary winding L32 of the isolation transformer 22A and the other end of the secondary winding L42 of the isolation transformer 22B. The cathodes of the diode (5) and the diode (6) are coupled to each other while being coupled to one end of the capacitor C5, and the midpoint of the secondary winding L32 of the isolation transformer 22A and the midpoint of the secondary winding L42 of the isolation transformer 22B are coupled to the other end of the capacitor C5.

In FIG. 16F, the polarity of each diode (the anode and the cathode) and the coupling relationship to the capacitor C5 are inverse of FIG. 16E.

Thus, in the sixth embodiment, the diodes included in the diode bridge are coupled to each other in anti-series. This makes it possible to reduce the number of the elements (the diodes) and the modules compared with the above-described embodiments.

SUMMARY

The power converter that is an embodiment of the present disclosure is described above.

The power converter of the present embodiment includes the boost circuit 10 (a three-level boost chopper) that applies voltages at three levels to the first line 110 to the third line 130 based on the input voltage.

Additionally, the power converter of the present embodiment includes the bridge circuit 21A that is provided between the first line 110 and the second line 120 and includes the switching elements Q3a to Q3d, the bridge circuit 21B that is provided between the second line 120 and the third line 130 and includes the switching elements Q4a to Q4d, and the voltage output circuit (the resonant isolation circuit 22, the rectifier circuit 23, and the smoothing circuit 24) that generates a predetermined DC voltage based on operations of the bridge circuit 21A and the bridge circuit 21B. With this, compared with the case of the comparative example, it is possible to use an element with a low withstand-voltage as the switching elements Q3a to Q3d and the switching elements Q4a to Q4d and to implement a stable operation.

The voltage output circuit includes the isolation transformer 22A in which the primary winding L31 is coupled to the bridge circuit 21A, the isolation transformer 22B in which the primary winding L41 is coupled to the bridge circuit 21B, the rectifier circuit 23 that rectifies the voltage induced in the isolation transformers 22A and 22B, and the smoothing circuit 24 that smooths the output of the rectifier circuit 23 and generates a predetermined DC voltage. With this, it is possible to perform the power conversion based on operations of the bridge circuit 21A and the bridge circuit 21B while providing an isolation between the input side and the output side.

The resonant capacitor C3 is coupled between the bridge circuit 21A and the primary winding L31 of the isolation transformer 22A, and the resonant capacitor C4 is coupled between the bridge circuit 21B and the primary winding L41 of the isolation transformer 22B. With this, it is possible to form a resonant circuit and to reduce a switching loss.

In the first embodiment (FIG. 2), the smoothing circuit 24 includes the capacitor C5a and the capacitor C5b coupled to each other in series, and the rectifier circuit 23 includes the diode bridge circuit 23A that rectifies the voltage induced in the secondary winding L32 of the isolation transformer 22A and supplies the capacitor C5a with the rectified voltage and the diode bridge circuit 23B that rectifies the voltage induced in the secondary winding L42 of the isolation transformer 22B and supplies the capacitor C5b with the rectified voltage. With this, it is possible to rectify a voltage with the series configuration of the diode bridge circuits.

In the second embodiment (FIG. 7), the smoothing circuit 241 includes the capacitor C5, and the rectifier circuit 231 includes the diode bridge circuit (the circuit including the diodes (5) and (6)) that rectifies the voltage induced in the secondary winding L32 of the isolation transformer 22A and supplies the capacitor C5 with the rectified voltage and the diode bridge circuit (the circuit including the diodes (7) and (8)) that rectifies the voltage induced in the secondary winding L42 of the isolation transformer 22B and supplies the capacitor C5 with the rectified voltage. With this, it is possible to rectify a voltage with the parallel configuration of the diode bridge circuits.

Each diode bridge circuit described above may be a full-wave rectifier circuit. In this case, it is possible to reduce the current flowing through each element (diode).

Each diode bridge circuit may be a half-wave rectifier circuit. In this case, it is possible to reduce the number of the elements.

In the fourth embodiment (FIG. 12), the smoothing circuit 241 includes the capacitor C5, and the rectifier circuit 234 includes the diode bridge circuits (the diodes (5) to (8)) that rectifies the voltage induced in the secondary winding (L32 or L42) of each of the isolation transformers 22A and 22B and supplies the capacitor C5 with the rectified voltage. With this, it is possible to reduce the number of the elements.

In the fifth embodiment (FIG. 14), the smoothing circuit 24 includes the capacitor C5a and the capacitor C5b coupled to each other in series, and the rectifier circuit 236 includes the diode bridge circuit (the diode (5)) that rectifies the voltage induced in the secondary winding (L32 or L42) of each of the isolation transformers 22A and 22B and supplies the capacitor C5a with the rectified voltage and the diode bridge circuit (the diode (6)) that rectifies the voltage induced in the secondary winding (L32 or L42) of each of the isolation transformers 22A and 22B and supplies the capacitor C5b with the rectified voltage. With this, it is possible to further reduce the number of the elements.

In the fourth and fifth embodiments, the control circuit 25 controls switching of the switching elements of the bridge circuit 21A and the bridge circuit 21B such that the voltages applied to the respective primary windings (L31 and L41) of the isolation transformers 22A and 22B are in phase.

With this, it is possible to rectify a voltage reliably.

The voltage output circuit (the resonant isolation circuit 22, the rectifier circuit 23, and the smoothing circuit 24) is a step-down converter, and a voltage between the first line 110 and the third line 130 is higher than the output voltage of the voltage output circuit. With this, it is possible to increase the output voltage of the boost circuit 10 and to reduce the conduction loss.

The boost circuit 10 includes the switching elements Q1 and Q2, and the withstand-voltages of the switching elements Q3a to Q3d and the switching elements Q4a to Q4d are the same as the withstand-voltages of the switching elements Q1 and Q2. With this, it is possible to reduce the types of the elements used.

The withstand-voltages of the switching elements Q5a, Q5b, Q6a, Q6b, Q7a, and Q7b of the three-phase inverter 30 that converts the output voltage of the voltage output circuit to the AC voltage are the same as the withstand-voltages of the switching elements Q1, Q2, Q3a to Q3d, and Q4a to Q4d. With this, it is possible to further reduce the types of the elements used.

It is also possible to form each of the diodes D1 and D2 of the boost circuit 10 by a switching element. In this case, each switching element of the boost circuit 10, the bridge circuits 21A and 21B, and the three-phase inverter 30 includes two switching elements coupled to each other in series, and the two switching elements are desirably stored in a predetermined package. With this, procurement and management are simplified.

Each switching element of at least the bridge circuits 21A and 21B is desirably formed of a wide gap semiconductor of SiC-based or the like. With this, it is possible to create an element with a high withstand-voltage with a low on-resistance. Additionally, it is possible to increase the switching speed and to reduce the switching loss.

The above-described embodiments are intended to facilitate understanding of the present disclosure and is not intended to construe the present disclosure with limitation. As a matter of course, the present disclosure can be changed or modified without departing from the intent, and the present disclosure includes an equivalent thereof.

For example, in the above-described embodiments, a case of application to a rail vehicle is described; however, the power converter of the present disclosure is not limited to be applied to a rail vehicle and can be appropriately used in a system with a great voltage variation on the input side (for example, a power conditioner system of wind power and solar light), for example.

The above-described embodiments are described with the resonant DC-DC converter using a series resonant circuit as a "power output circuit"; however, it is not limited thereto. For example, parallel resonant, an inverter rectifying method, and another isolation converter may be applied.

In the above-described embodiments, the boost circuit 10 is a three-level boost chopper; however, it is not limited thereto. For example, a converter of two levels or four or more levels may be applied. Depending on the input voltage, a step-down circuit may be applied.

Figure 17:
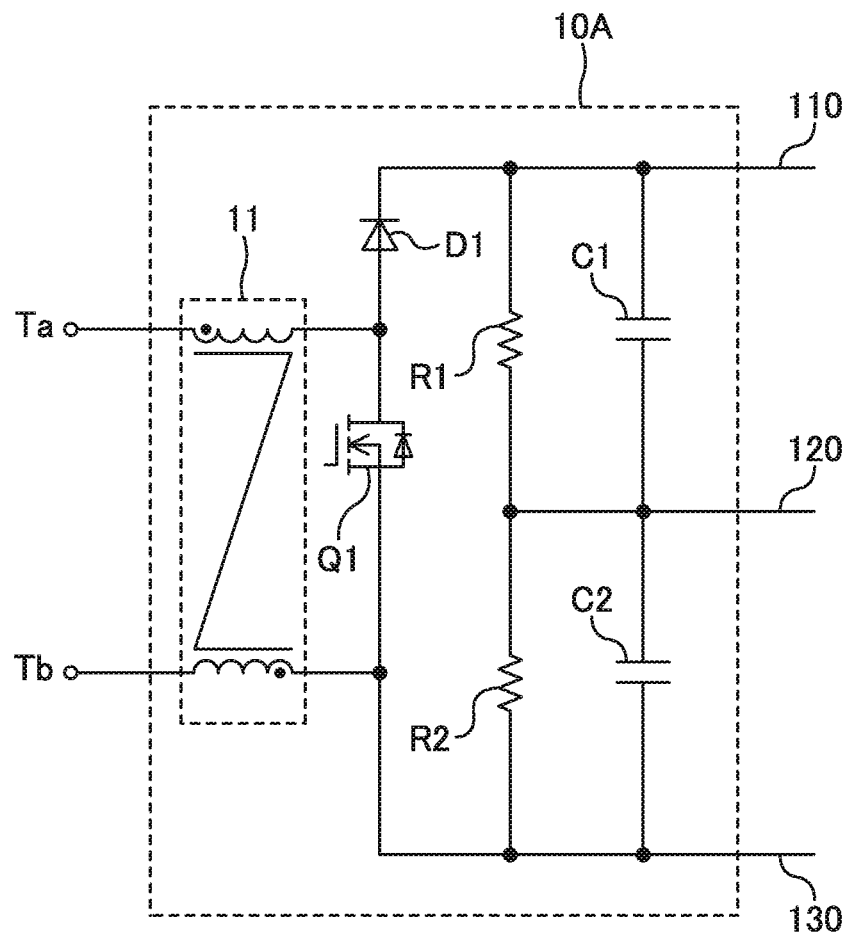
FIG. 17 is an explanatory diagram of an example of a voltage converter circuit that is used instead of a boost circuit.

FIG. 17 is an explanatory diagram of an example of a voltage converter circuit used instead of the boost circuit. In FIG. 17, portions having the same configuration as that in FIGS. 1 and 2 are marked with the same reference numerals, and the description is omitted. A voltage converter circuit 10A illustrated in FIG. 17 includes the coupling reactor 11, the switching element Q1, the diode D1, the capacitors C1 and C2, and resistors R1 and R2. The switching element Q1 of the voltage converter circuit 10A is coupled to the third line 130 and is not coupled to the second line 120.

The coupling reactor 11, the switching element Q1, and the diode D1 generate voltages at two levels based on the input voltage to apply a voltage on the high side to the first line 110 and apply a voltage on the low side to the third line 130. In other words, the coupling reactor 11, the switching element Q1, and the diode D1 correspond to a two-level "converter".

The resistor R1 is provided between the first line 110 and the second line 120 in parallel to the capacitor C1, and the resistor R2 is provided between the second line 120 and the third line 130 in parallel to the capacitor C2. The resistors R1 and R2 and the capacitors C1 and C2 generate a voltage (for example, a middle voltage) obtained by dividing the voltage of the first line 110 and the voltage of the third line 130 (the output of the "converter") to apply the generated voltage to the second line 120. In other words, the resistors R1 and R2 and the capacitors C1 and C2 correspond to a "voltage divider circuit". The resistors R1 and R2 are resistors provided to stabilize the voltage of the second line 120. The resistors R1 and R2 may be omitted, and the voltage division may be performed by adjusting the capacitances of the capacitors C1 and C2. Likewise, also in FIGS. 1 and 2, a resistor may be provided between the first line 110 and the second line 120 and between the second line 120 and the third line 130.

Thus, the voltage converter circuit 10A can output voltages at three levels by using the two-level converter. As described above, the converter may be a boost circuit or may be a step-down circuit.

The number of the bridge circuits provided in the resonant DC-DC converter 20 of the above-described embodiments is two; however, the number is not limited to two, and three or more bridge circuits may be provided in accordance with the number of lines.

The present disclosure is made in view of the above-described conventional problems, and an object thereof is to provide a power converter that can operate stably.

According to the present disclosure, it is possible to provide a power converter that can operate stably.

What is claimed is:

1. A power converter, comprising:
   a first line to which a first voltage is applied;
   a second line to which a second voltage lower than the first voltage is applied;
   a third line to which a third voltage lower than the second voltage is applied;
   a first bridge circuit that is provided between the first line and the second line, the first bridge circuit including a plurality of first switching elements;
   a second bridge circuit that is provided between the second line and the third line, the second bridge circuit including a plurality of second switching elements; and
   a voltage output circuit configured to generate a predetermined direct current (DC) voltage based on operations of the first and second bridge circuits, wherein
   at least one of the plurality of first switching elements and at least one of the plurality of second switching elements are directly connected to the second line.

2. The power converter according to claim 1, wherein at least each of the first and second switching elements is formed of a wide-bandgap semiconductor.

3. The power converter according to claim 1, wherein the voltage output circuit includes
   a first isolation transformer including a primary winding coupled to the first bridge circuit, and a secondary winding,
   a second isolation transformer including a primary winding coupled to the second bridge circuit, and a secondary winding,
   a rectifier circuit configured to rectify
      a first induced voltage that is induced in the secondary winding of the first isolation transformer, and
      a second induced voltage that is induced in the secondary winding of the second isolation transformer, and
   a smoothing circuit configured to smooth an output of the rectifier circuit and generate the predetermined DC voltage.

4. The power converter according to claim 3, further comprising:
   a first resonant capacitor that is coupled between the first bridge circuit and the primary winding of the first isolation transformer; and
   a second resonant capacitor that is coupled between the second bridge circuit and the primary winding of the second isolation transformer.

5. The power converter according to claim 3, wherein the smoothing circuit includes a first capacitor and a second capacitor coupled to each other in series, and the rectifier circuit includes
   a first diode bridge circuit configured to rectify the first induced voltage and supply the first capacitor with the rectified first induced voltage, and
   a second diode bridge circuit configured to rectify the second induced voltage and supply the second capacitor with the rectified second induced voltage.

6. The power converter according to claim 5, wherein each of the first and second diode bridge circuits is a full-wave rectifier circuit.

7. The power converter according to claim 5, wherein each of the first and second diode bridge circuits is a half-wave rectifier circuit.

8. The power converter according to claim 3, wherein the smoothing circuit includes a capacitor, and the rectifier circuit includes
   a diode bridge circuit configured to rectify each of the first and second induced voltages and supply the capacitor with the rectified first or second induced voltage.

9. The power converter according to claim 8, further comprising:
   a control circuit configured to control switching of the plurality of the first and second switching elements such that voltages applied to the primary windings of the first and second isolation transformers are in phase.

10. The power converter according to claim 3, wherein the smoothing circuit includes a capacitor, and the rectifier circuit includes
    a first diode bridge circuit configured to rectify the first induced voltage and supply the capacitor with the rectified first induced voltage, and
    a second diode bridge circuit configured to rectify the second induced voltage and supply the capacitor with the rectified second induced voltage.

11. The power converter according to claim 3, wherein the smoothing circuit includes a first capacitor and a second capacitor coupled to each other in series, and the rectifier circuit includes
- a first diode bridge circuit configured to rectify each of the first and second induced voltages and supply the first capacitor with the first or second induced voltage after the rectification by the first diode bridge circuit, and
- a second diode bridge circuit configured to rectify each of the first and second induced voltages and supply the second capacitor with the first or second induced voltage after the rectification by the second diode bridge circuit.

12. The power converter according to claim 1, wherein the voltage output circuit is a step-down converter, and a voltage between the first line and the third line is higher than the predetermined DC voltage.

13. A power converter, comprising:
- a first line to which a first voltage is applied;
- a second line to which a second voltage lower than the first voltage is applied;
- a third line to which a third voltage lower than the second voltage is applied;
- a first bridge circuit that is provided between the first line and the second line, the first bridge circuit including a plurality of first switching elements;
- a second bridge circuit that is provided between the second line and the third line, the second bridge circuit including a plurality of second switching elements;
- a voltage output circuit configured to generate a predetermined direct current (DC) voltage based on operations of the first and second bridge circuits;
- a converter configured to generate the first voltage and the third voltage based on an input voltage of the power converter; and
- a voltage divider circuit configured to generate the second voltage by dividing an output of the converter.

14. A power converter, comprising:
- a first line to which a first voltage is applied;
- a second line to which a second voltage lower than the first voltage is applied;
- a third line to which a third voltage lower than the second voltage is applied;
- a first bridge circuit that is provided between the first line and the second line, the first bridge circuit including a plurality of first switching elements;
- a second bridge circuit that is provided between the second line and the third line, the second bridge circuit including a plurality of second switching elements;
- a voltage output circuit configured to generate a predetermined direct current (DC) voltage based on operations of the first and second bridge circuits; and
- a converter configured to apply the first voltage to the first line, apply the second voltage to the second line, and apply the third voltage to the third line based on an input voltage of the power converter.

15. The power converter according to claim 14, wherein the converter includes a plurality of third switching elements, and
a withstand-voltage of each of the first and second switching elements is the same as a withstand-voltage of each of the third switching elements.

16. The power converter according to claim 15, further comprising:
- an inverter that includes a plurality of fourth switching elements and that is configured to convert the predetermined DC voltage into an alternating current (AC) voltage, wherein
- a withstand-voltage of each of the fourth switching elements is the same as the withstand-voltage of each of the first to third switching elements.

17. The power converter according to claim 16, wherein each of the plurality of first to fourth switching elements includes two switching elements coupled to each other in series, and
the two switching elements are stored in a predetermined package.

* * * * *